United States Patent
Kumar et al.

(10) Patent No.: US 12,182,789 B2
(45) Date of Patent: Dec. 31, 2024

(54) APPLICATION AND PLATFORM FOR INTEGRATING MICROAPPS USING APPLICATION PROGRAMMING INTERFACES (APIs)

(71) Applicant: Google LLC, Mountain View, CA (US)

(72) Inventors: Kishore Kumar, Singapore (SG); Yuan Li, Sunnyvale, CA (US); Lee Lee Choo, Singapore (SG); Guibin Kong, Fremont, CA (US); Steven Soneff, Mountain View, CA (US); Joshua Tan, Singapore (SG); Michael Yeung, Mountain View (CA); Jun Lan, Shang-Hai (CN); Weijia He, Shang-Hai (CN); Jiang Sheng, Singapore (SG); Yichi Zhang, Singapore (SG); Rama Ranganath, Tiburon, CA (US); Vivek Agarwal, Fremont, CA (US); Cong Liu, Singapore (SG); Fabian Daniel Schlup, Singapore (SG); Arjita Madan, Nellore (IN)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/698,904

(22) PCT Filed: Sep. 19, 2019

(86) PCT No.: PCT/CN2019/106568
§ 371 (c)(1),
(2) Date: Mar. 18, 2022

(87) PCT Pub. No.: WO2021/051330
PCT Pub. Date: Mar. 25, 2021

(65) Prior Publication Data
US 2024/0046238 A1 Feb. 8, 2024

(51) Int. Cl.
*G06Q 20/22* (2012.01)
*G06F 9/455* (2018.01)
(Continued)

(52) U.S. Cl.
CPC .................... *G06Q 20/29* (2013.01)

(58) Field of Classification Search
CPC ..... G06Q 20/29; G06F 21/41; G06F 21/6245; G06F 2221/2111; G06F 9/45504
(Continued)

(56) References Cited

U.S. PATENT DOCUMENTS 10,635,433 B2 * 4/2020 Khoongumjorn ..... G06F 9/4488
2007/0250780 A1 10/2007 Choudhary et al.
(Continued)

*Primary Examiner* — Clifford B Madamba
(74) *Attorney, Agent, or Firm* — DORITY & MANNING P.A.

(57) ABSTRACT

A computing system (100) that includes at least one microapp (202) and a container application (204) configured to receive an application output from the microapp(s) (202, 602) via an application programming interface. The computing system (100) can include at least one processor (112,132) and at least one tangible, non-transitory computer-readable medium that stores instructions that, when executed by the at least one processor (112,132), cause the at least one processor (112,132) to perform operations. The operations can include providing, for display within a first panel (304) in a user interface (306), a navigation bar (302) based on data received from the container application (204); receiving, at the container application (204), the application output from the at least one microapp (202) via the application programming interface; and providing, for display within a second panel in the user interface (306), data describing the application output.

14 Claims, 19 Drawing Sheets

(51) Int. Cl.
*G06F 21/41* (2013.01)
*G06F 21/62* (2013.01)
*G06Q 20/32* (2012.01)

(58) Field of Classification Search
USPC .......................................................... 705/39
See application file for complete search history.

(56) References Cited

U.S. PATENT DOCUMENTS

2014/0108793 A1\* 4/2014 Barton ................ G06F 21/6218
713/165
2014/0149998 A1 5/2014 Kumar et al.
2016/0191499 A1\* 6/2016 Momchilov ............ G06F 21/78
713/171

\* cited by examiner

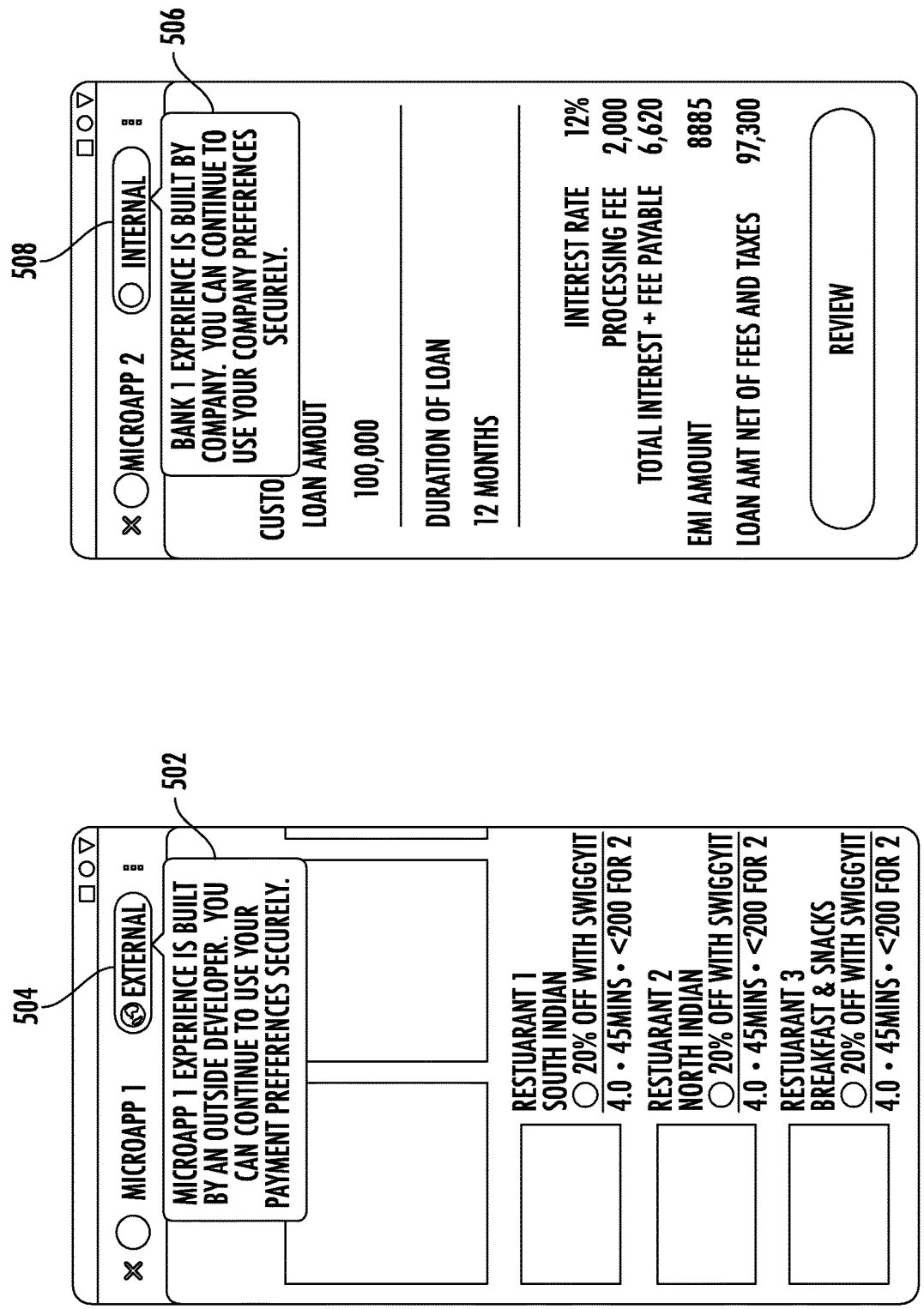

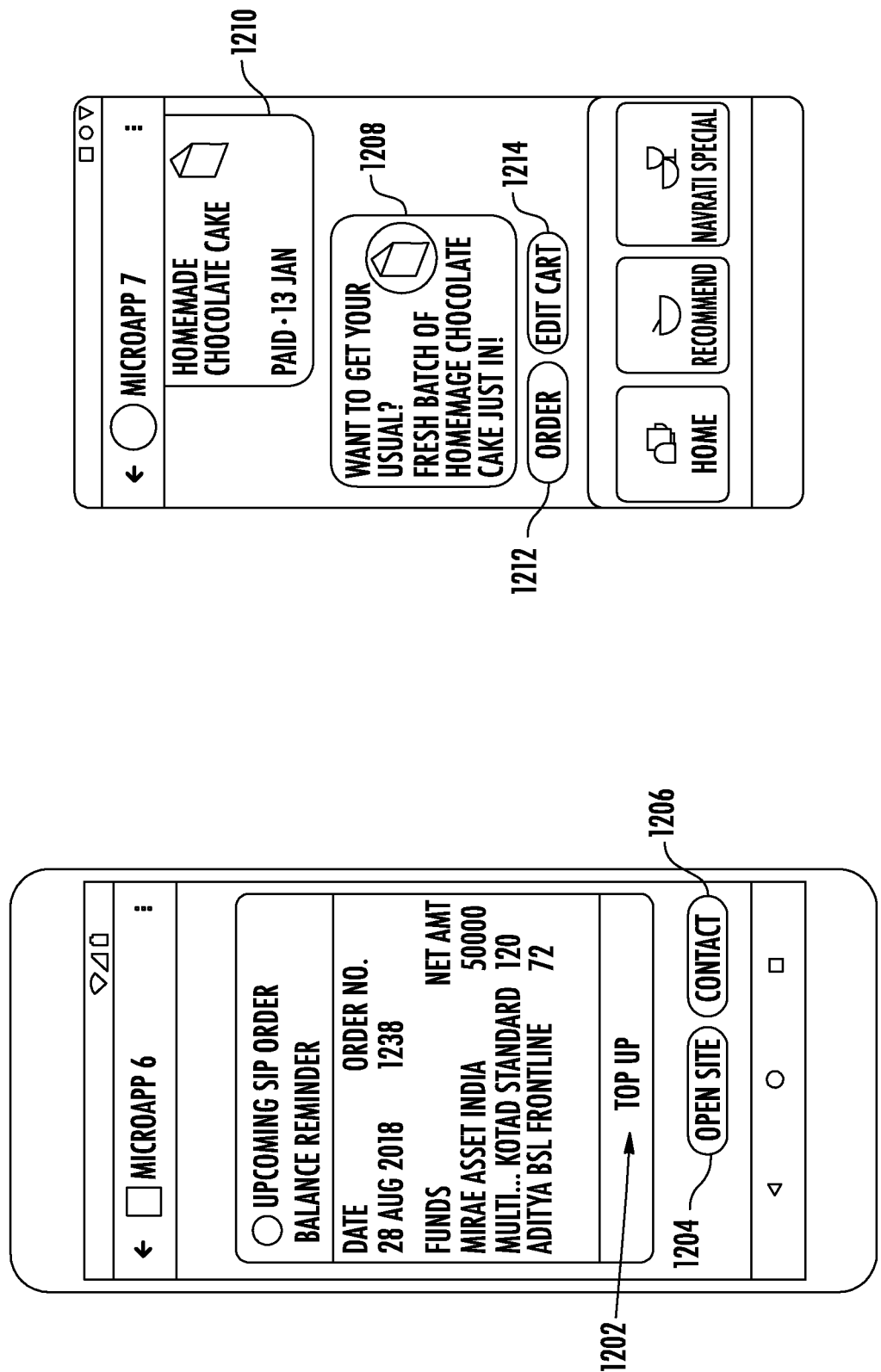

APPLICATION AND PLATFORM FOR INTEGRATING MICROAPPS USING APPLICATION PROGRAMMING INTERFACES (APIs)

PRIORITY CLAIM

This application is based upon and claims the right of priority under 35 U.S.C. § 371 to International Application No. PCT/CN2019/106568, filed on Sep. 19, 2019, which is incorporated by reference herein in its entirety.

FIELD

The present disclosure relates generally to integration and interactions between computer applications. More particularly, the present disclosure relates to systems and methods for integrating microapps into a container application and/or platform.

BACKGROUND

Applications for mobile devices are often used to conduct financial transactions, such as sending and/or receiving money, purchasing goods, and/or ordering services. Using a variety of distinct applications, however, has several drawbacks. For example, users generally have individual credentials for each distinct application, which can be difficult for the user to remember. Similarly, the user generally needs to create new accounts with associated credentials for each application that is downloaded and installed, which can be cumbersome. Further, use of distinct applications can pose security risks as the user's financial information (e.g., bank account information, credit card number, etc.) is shared with each application. Accordingly, a system or platform for integrating multiple applications in a manner that addresses the above issues would be welcomed in the art.

SUMMARY

Aspects and advantages of embodiments of the present disclosure will be set forth in part in the following description, or can be learned from the description, or can be learned through practice of the embodiments.

One example aspect of the present disclosure is directed to a computing system that includes at least one microapp and a container application configured to receive an application output from the microapp(s) via an application programming interface. The computing system can include at least one processor and at least one tangible, non-transitory computer-readable medium that stores instructions that, when executed by the at least one processor, cause the at least one processor to perform operations. The operations can include providing, for display within a first panel in a user interface, a navigation bar based on data received from the container application; receiving, at the container application, the application output from the at least one microapp via the application programming interface; and providing, for display within a second panel in the user interface, data describing the application output.

Another example aspect of the present disclosure is directed to a computing system including a microapp and a container application configured to receive data describing a transaction from the microapp via an application programming interface. The computing system can include at least one processor and at least one tangible, non-transitory computer-readable medium that stores instructions that, when executed by the processor(s), cause the processor(s) to perform operations. The operations can include performing a transaction with the microapp; receiving, at the container application, the data describing the transaction from the microapp via the application programming interface; and providing, for display in a user interface, the data describing the transaction according to the application programming interface. The application programming interface can include a template describing an arrangement of the data describing the transaction within the user interface.

Another example aspect of the present disclosure is directed to a computer-implement method for integrating a microapp into a container application. The computer-implement method can include providing, by one or more computing devices and for display within a first panel in a user interface, a navigation bar based on data received from the container application, the container application configured to receive an application output from the at least one microapp via an application programming interface; receiving, by the one or more computing devices and at the container application, the application output from the at least one microapp via the application programming interface; and providing, by the one or more computing devices and for display within a second panel in the user interface, data describing the application output.

Another example aspect of the present disclosure is directed to a computer-implement method for integrating a microapp into a container application. The computer-implement method can include performing, by one or more computing devices, a transaction with the microapp; receiving, by one or more computing devices and at the container application, the data describing the transaction from the microapp via the application programming interface; and providing, by one or more computing devices and for display in a user interface, the data describing the transaction according to the application programming interface, wherein the application programming interface comprises a template describing an arrangement of the data describing the transaction within the user interface.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 5A and 5B depict example navigation bars with notifications providing additional information about source indicators according to example embodiments of the present disclosure.

FIG. 12A depicts a user interface in which a prompt is displayed to remind the user to deposit funds in the user's account according to aspects of the present disclosure.

FIG. 12B depicts a user interface in which a message is displayed to suggest that the user make a purchase according to aspects of the present disclosure.

Figure 1:
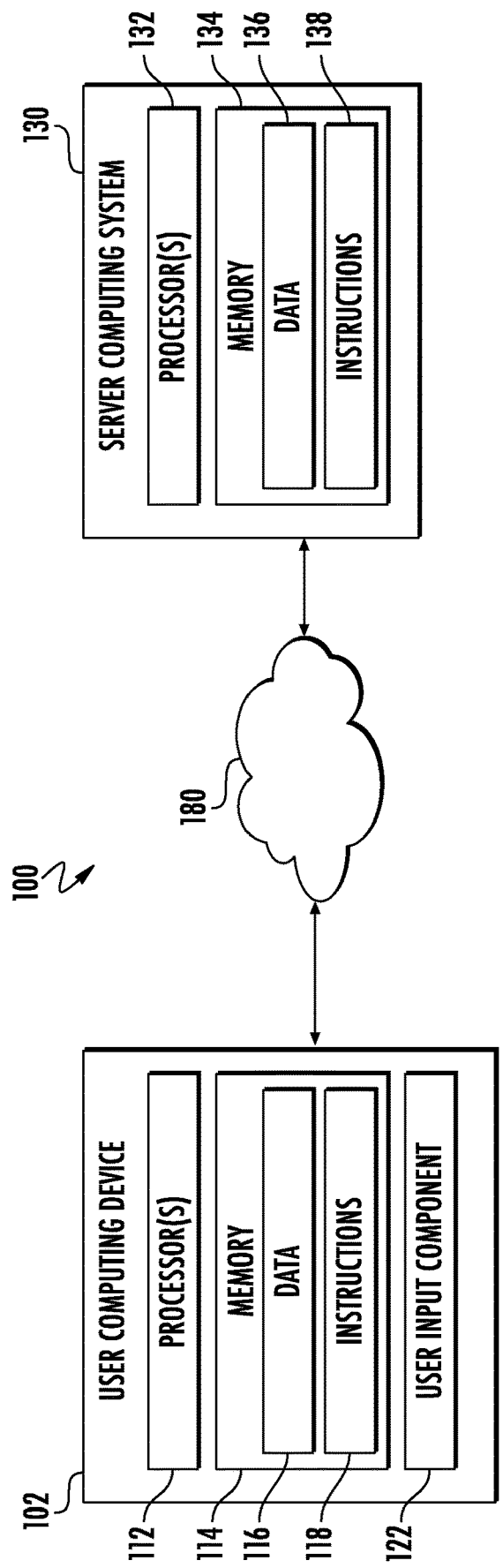
FIG. 1 depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to systems and methods for integrating micro applications into a container application and/or platform. A micro application (referred to herein as a "microapp" generally refers to a lightweight application for a mobile device that is provided within or through another container application. For example, a container application such as a traditional mobile device application can invoke a microapp to carry out a specific task within the container application. Microapps can have focused functionality based on pre-defined guidelines established by the container application. In certain aspects of the present disclosure, pre-defined application programming interfaces (APIs) and/or software development kits (SDKs) can be provided to developers of third-party microapps with guidelines and/or tools to design the microapps that can be accessed within and/or through the container application. For example, the container application can securely store the user's banking information and facilitate purchases, payment requests, and the like with the microapps without sharing the user's banking information with those microapps. This configuration can provide improved security compared with directly sending and/or receiving funds through distinct third-party applications. Similarly, the container application can securely store other user information, such as the user's preferred shipping address and/or user preferences for particular goods and services without sharing this information with the microapps. Thus, the container application/platform described herein can facilitate user engagement with third party microapps in a manner that improves security.

According to aspects of the present application, APIs can be used to provide a variety of functions and/or operations from the microapp(s) within the container application. Examples APIs include payment (e.g., to request payment), phone number (e.g., to request phone number), location (e.g., to learn a user's location), orders (e.g., to provide transaction details), identity (e.g., to learn user's identity), shipping (e.g., to learn user's shipping address), share (to let user share), scan (e.g., to let the user scan a QR code, barcode, or the like), near (e.g., to learn a user's proximity to store and/or beacon), cart, messages, and the like. Specific implementations can include messaging user contacts, sharing completed payments, sending payment requests (e.g., to share payment of an item) with the user contact(s), paying for goods or services for or on behalf of a particular user contact (e.g., as a gift to the user contact), and receiving notifications from the microapps. Additionally, the APIs can be designed to facilitate a variety of high-level operations (e.g., QR code recognition) as opposed to low-level operations (e.g., camera access). As such, APIs can encourage development of microapps by making such development easier and more intuitive.

According to aspects of the present application, the container application and/or APIs can control aspects of the user experience to improve continuity of the user's experience across multiple microapps. For example, the container application can control how notifications from the microapp are presented to the user (e.g., how "attention-grabbing" a specific notification is allowed to be). The container application can select a notification method (e.g., as a banner, alert, silent notification visible only when accessing the container application, etc.) based on the user's preferences and/or device setting (e.g., silent, do not disturb, ringer on, etc.). Thus, the container application can control how the microapps present notifications to the user.

As another example, the APIs can provide templates and/or pre-defined task flows to improve continuity in the user experience across different microapps that can be accessed from the container application. For instance, once an "order" is placed (e.g., for a meal), the container application can control how and when updates are presented to the user (e.g., regarding the status of the meal preparation). Lastly, the container application can provide a centralized control or setting panel where the user can adjust settings or preferences that apply to multiple microapps. Thus, the container application can improve the user's experience, as compared with directly accessing a variety of distinct applications.

In some implementations, a navigation bar can be provided for displaying information about the microapp(s) and/or for providing the user with controls with respect to the microapp(s). The navigation bar can be displayed within a first panel in a user interface. Data describing application output(s) received from the microapp(s) via one or more APIs can be displayed in a second panel in the user interface. The controls can include an exit icon to allow the user to exit the microapp (e.g., to return to a main menu of the container application). The controls can include a share icon for the user to share (e.g., on social media, by text message, by email, etc.) aspects of the user's experience with the microapp. As a further example, the navigation bar can provide the user with the ability to adjust settings for the particular microapp being access and/or general settings for all microapps that are accessible through the container application/platform. Thus, the navigation bar can provide the user with controls with respect to one or more of the microapps.

The navigation bar can display information about the microapp being accessed. For example, the navigation bar can display a source indicator that describes a source of the microapp (e.g., a company or brand associated with the microapp). For instance, an icon or indicator can be provided that describes whether the microapp has the same source (e.g., same developer, same company, etc.) as the container application. In such an event, the user may be more trusting or comfortable with the microapp as the user may trust the source of the container application. Conversely, an indicator that shows that the microapp is from a different source from the container application may alert the user to be more cautious with respect to that microapp. Thus, the navigation bar can provide information, including a source indicator, with respect to the microapp.

In some implementations, a plurality of microapps can be accessible from the container application. The user can navigate through a list or menu structure to locate a desired microapp. For example, indicators can be displayed within the user interface that respectively correspond with the microapps and/or categories of microapps. The user can scroll through the indicators to locate the desired microapp or category of microapps. (e.g., based on the type of goods or services associated with the microapp). Thus, the container application can provide the user with an ability to navigate multiple microapps to locate a specific, desired microapp.

In some implementations, the container application can locate nearby goods or services based on the user's location and/or preferences and suggest a relevant microapp to the user. The container application can provide a list of microapps corresponding with the nearby services or stores. For instance, the user can be notified that coffee can ordered from a favorite coffee shop when the user is nearby one of the coffee shop's locations. The container application can suggest an appropriate microapp, such as a microapp released by the coffee shop or a more general coffee or food ordering microapp. Additional information can optionally be included about the services and/or stores, such as a distance to the location of the store and/or service location, a time until the service can be provided (e.g., a movie show time, time until a meal can be ready once ordered, etc.). The user can select one of the microapps and complete the transaction form within the container application. Thus, the container application can facilitate identifying a relevant microapp based on the user's location and/or preferences, engaging with a microapp (e.g., to select a product or service), and sending or receiving funds through the container application to place an order and/or complete a transaction.

In some implementations, the container application can verify an identity of a user of the computing device based on a user account of the user associated with the container application. More specifically, the user can have a pre-existing account that is accessible from the container application. The container application can verify the identity of the user by accessing the pre-existing account of the user to "log the user into" a selected microapp. Thus, the container application can facilitate user identification and/or verification such that the user does not have to create individual log-in credentials and/or accounts for each microapp.

According to another aspect of the present disclosure, the user can communicate with other users or contacts through the container application. For example, the user can share a recently completed event, such as a completed payment, payment request, or the like. The user can share the recently completed event directly with a contact of the user and/or "post" the completed event on social media or the like.

In some implementations, the container application can help the user locate a desired application in a "discovery" stage. For example, the user can perform a search within the container application for a particular good or service. The search can return a list of microapps that are available for providing the requested good or service. The user can select a desired microapp to view a storefront of the selected microapp.

Next, in the "conversation" stage, the user can engage with the microapp to customize and place an "order" within the storefront. An "order" can refer to a purchase of a good or service that involves subsequent delivery of the good or service. A "messaging" or "conversation" interface can be displayed in which updates can be provided in the form of messages. The "conversation" interface can provide an intuitive way of communicating a history of the user's interactions with the particular Microapp (e.g., including previous orders, updates, and the like).

As indicated above, the container application/platform can provide a number of specialized APIs for developers. As one example, a "Shell" API can be configured to control and/or organize the manner in which the microapp is displayed and/or accessed in the container application. A "storefront" can be defined in which the microapp can display available goods and services, offers, and the like. Various status icons can be included to convey current information about one or more statuses of the microapp, such as current settings, permissions, and the like. Thus, the "Shell" API can facilitate continuity in the "look and feel" of microapps that are accessible within the container application/platform. Further, providing the user with predictable access to settings and/or permissions (e.g., globally or individually for each microapp) can improve the user's trust and comfort with the microapps.

As another example, an "Orders" API can be provided that streamlines and standardizes procedures processing and presenting orders and/or offers of goods and/or services to the user within the container application and microapp. Before a transaction is completed, the "Orders" API can define a first set template and/or set of rules with respect to how offers, messages, customer support messages, and the like may be presented to the user. Once the user has selected the goods, services and/or customized options associated with the good and/or service, the "Orders" API can facilitate completion of the transaction. After the transaction is completed, the "Orders" API can control how confirmations, status updates (e.g., tracking, delivery status, etc.), deliverables (e.g., itinerary, tickets, passes), and the like are stored, shared, or otherwise manipulated by the user. Thus, the "Orders" API can improve continuity of the user's experience across multiple microapps when placing orders through the container application/platform.

As another example, a "Payment" API can be configured to control how financial transactions are conducted through the container application and/or control aspects of the display of various information related with such financial transactions. The "Payment" API can control how, when, and where sensitive information is transmitted, such as financial details (e.g., banking information) and/or personal information (e.g., phone number, e-mail address, mailing address, etc.) For instance, container application can receive a transaction destination (e.g., data describing a bank account or the like) from a microapp via the "Payment" API. The payment applicant can then send a payment, payment request, or the like to the transaction destination without sharing the sensitive information with the microapp. Thus, the "Payment" API can provide increased security for the user as compared with entering the user's sensitive information directly into a multitude of applications outside of the container application/platform. The "Payment" API can also include features for sharing or splitting payments of items and/or for paying for items on the behalf of another user (e.g., as a gift to the user).

As yet a further example, a sensor API can be included that controls access and/or provides features with respect to sensors, such as camera(s), microphone(s), Global Positioning Sensor (GPS), or the like of the user device by the microapp(s). For example, the sensors API can control when and/or how the microapp(s) may access the sensors. Such control can be based on user-adjustable settings within the container application/platform. The sensors API can further include one or more utilities that can perform operations based on data received from the sensors of the user device. As an example, the sensors API can include a scanning utility for visual codes (e.g., QR code, bar code, etc.) based on images received from the camera(s) of the user device. As another example, the sensor API can facilitate voice recognition or analysis of audio received from the microphone(s) of the user device. Additionally, the sensor API can selectively provide access to one or more of the sensors (e.g., camera, microphone, etc.) based on receiving credentials, for example through near field communication (NFC), Bluetooth, Wi-Fi, or other suitable types of communication. Similarly, the sensor API can selectively provide access to various means of communication based on a location of the user device (e.g., as detected by GPS sensor data and/or by communication through one or more of the communication means described above). For instance, NFC can be used to unlock access to one the camera(s) when near a specific location (e.g., an ATM, a business, etc.) for completing a purchase or conducting a transaction. The user computing device can determine its location using GPS sensor data, connectivity with Wi-Fi, Bluetooth, or the like. Thus, the sensor API can control and/or provide utilities or features for the microapps with respect to the sensors of the user device.

As yet a further example, a connectivity API can be included that controls access to one or more types of communications, including near field communication (NFC), Bluetooth, Wi-Fi, or other suitable types of communication. The connectivity API can control or provide access to such communication means based on the type of computer application, a location of the device, receiving credentials, and the like.

In some implementations, the container application and/or platform can leverage one or more machine-learned models to aid in suggesting microapps and/or performing related tasks for the user. For example, the container application can suggest microapps based on the user's preferences, which can be learned based on the user's interactions with the container application and/or microapps, if the user has so consented.

Aspects of this application are also directed to providing feedback (e.g., in the form of reports or statistics) and/or facilitating troubleshooting with developers of the microapps if the user has so consented. For example, the container application can collect information about how the user engages with the various microapps in different situations or scenarios. The microapp developers can use this information to improve the microapps. As another example, the microapp developers can setup automatic alerts for specific types of errors or user behavior. For instance, an "automated check" can be implemented to note each time a user engages with the microapp (e.g., to certain level or stage in a pre-defined process or flowchart) but does not complete the financial action (e.g., purchase, payment request, etc.). As a further example, the microapp developer can define particular user feedback questions and/or prompts to be presented within the microapp. These features can be provided within a developer portal for the container application. Thus, aspects of this application will be directed to improving the developers' experience.

Additional aspects of the present disclosure are directed to providing microapp developers with the ability to develop microapps in standard and/or non-proprietary programming languages. Microapps can be created (e.g., assembled, written, coded, etc.) using authoring tools that are publically available and/or framework agnostic. For example, JavaScript (JSS) for Cascading Style Sheets (CSS) can be used to develop the microapps using HTML. Thus, the platform described herein can provide for more accessible microapp development.

In some implementations, a variety of distinct software development kits (SDKs) can be provided that correspond with respective "use cases" or applications, such as different types of goods, services, delivery models, and the like. For example, distinct SDKs can respectively correspond with food delivery applications, tickets/passes ordering (e.g., electronically deliverable goods and services), social media applications, and so forth. These various SDKs can have differing API sets, permissions, and/or settings that are pre-configured or pre-defined based on the intended application and/or use case.

The permissions and/or security settings of the various SDKs can be pre-configured based on the intended use case of the SDK. For instance, an "electronic goods" SDK can be designed for microapps for ordering and delivering electronic items, such as e-tickets or e-passes. The "electronic goods" SDK can have pre-set permissions that prohibit the microapp from obtaining the user's current location, mailing address, etc. as this information is not typically necessary for purchasing and electronically receiving an e-ticket or e-pass. In this example, the pre-set permissions, however, may enable collecting the user's preferences with respect to movies, airlines, or the like (if the user has so consented).

As another example, a "physical goods" SDK for delivering food, consumer goods, and the like can have pre-set permissions that enable collecting geographical information about the user (e.g., the user's physical location, home address, work address or the like) if the user has so consented but prohibits collecting the user's preferences with respect to movies, airlines, or the like. Such preferences are not typically relevant to delivery of physical goods, such as food. Thus, the various SDKs can have different permissions depending on the intended use cases associated with the respective SDKs.

Similarly, the various SDKs can include differing sets of APIs that are appropriate for the intended "use case" or application of the SDK. For example, the example "physical goods" SDK described above may include the "sensor" API (also described above), for example for scanning a product code to shop for or learn more about a physical product. Conversely, the "electronic goods" SDK can exclude the "sensor" AP because access to the sensors (e.g., cameras and/or microphones) of the user device may not be useful or appropriate when purchasing an electronic ticket. It should be understood that the above-described examples of use-case SDKs are examples only. More specific and/or granular use cases are contemplated within the scope of this disclosure (e.g., a "coffee delivery" SDK, a "music purchasing" SDK, and so forth).

Thus, aspects of the present disclosure can improve the accessibility of the platform to microapp developers while still safeguarding against undesirable microapp features or activity (e.g., unwanted data collection and/or maliciously designed microapps). More specifically, the non-proprietary coding capability and/or compatibility described above can improve the platform's accessibility to developers. The use-case-specific SDKs can provide mechanisms for systematically protecting users by limiting capabilities (e.g., through permissions and/or APIs) of the microapps. In combination, these features can provide a robust platform for development of secure microapps.

The container application can aggregate and/or store data received from different microapps in a common location. As one example, the data can include user interactions, order history, user preferences, or the like. The common location can include on-device memory, a network location, a cloud computing storage location or the like. As another example, the container application can aggregate updates from the various microapps and present them in a combined message or notification stream.

As one example, the systems and methods of the present disclosure can be included or otherwise employed within the context of an application, a browser plug-in, or in other contexts. Thus, in some implementations, the models of the present disclosure can be included in or otherwise stored and implemented by a user computing device such as a laptop, tablet, or smartphone. As yet another example, the models can be included in or otherwise stored and implemented by a server computing device that communicates with the user computing device according to a client-server relationship. For example, the models can be implemented by the server computing device as a portion of a web service (e.g., a web email service).

With reference now to the Figures, example embodiments of the present disclosure will be discussed in further detail.

Example Devices and Systems

FIG. 1 depicts a block diagram of an example computing system 100 for integrating a microapps with respect to a container application according to example embodiments of the present disclosure. The system 100 can include a user computing device 102 and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication. The user computing device 102 can also include one or more sensors 124, such as microphones, cameras, temperature sensors, accelerometers, and the like.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example Embodiments

One or more APIs control how the microapp(s) are integrated within the container application. As indicated above, examples APIs can include orders (e.g., to provide transaction details for example as described below with reference to FIGS. 13 through 17), payment (e.g., to request payment), phone number (e.g., to request phone number), location (e.g., to learn a user's location), identity (e.g., to learn user's identity), shipping (e.g., to learn user's shipping address), share (to let user share), scan (e.g., to let the user scan a QR code, barcode, or the like), near (e.g., to learn a user's proximity to store and/or beacon), cart, messages, and the like. Specific implementations can include messaging user contacts, sharing completed payments, sending payment requests (e.g., to share payment of an item) with the user contact(s), paying for goods or services for or on behalf of a particular user contact (e.g., as a gift to the user contact), and receiving notifications from the microapps. Additionally, the APIs can be designed to facilitate a variety of high-level operations (e.g., QR code recognition) as opposed to low-level operations (e.g., camera access). As such, APIs can encourage development of microapps by making such development easier and more intuitive.

Figure 2:
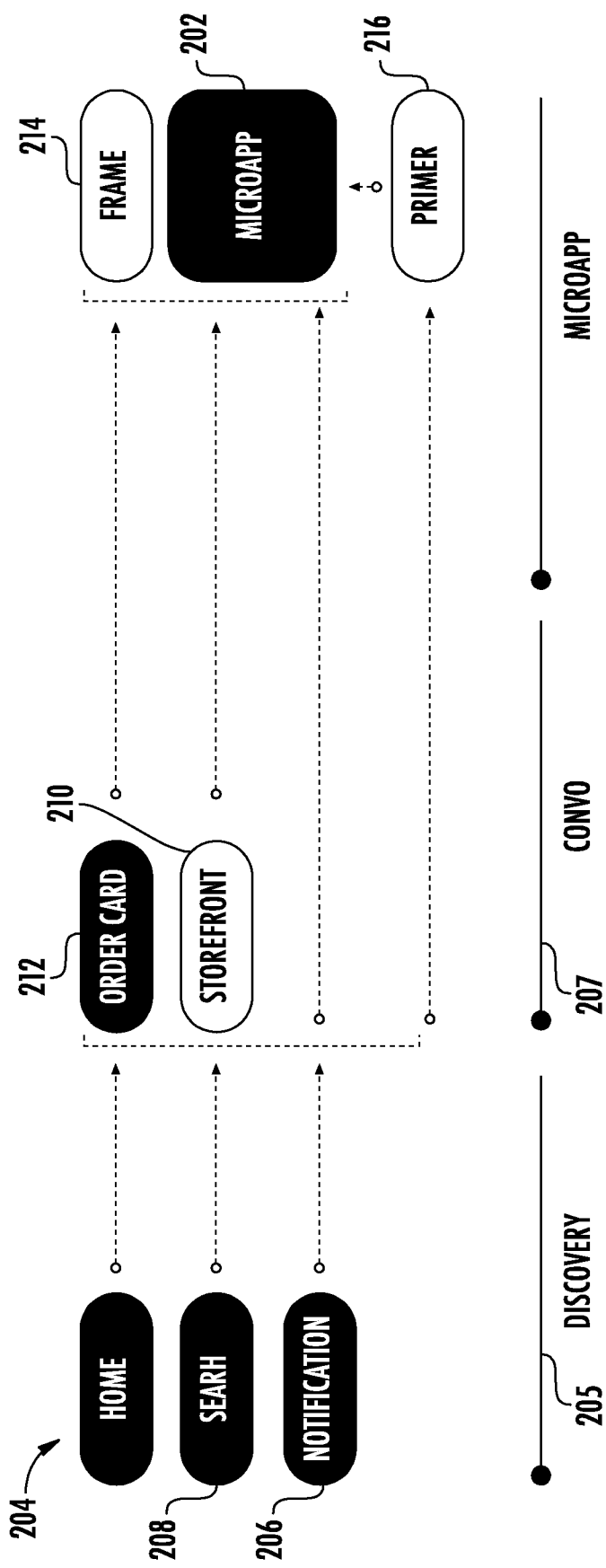
FIG. 2 depicts a simplified schematic diagram of a microapp integrated within a container application according to example embodiments of the present disclosure.

FIG. 2 depicts a simplified schematic diagram of a microapp 202 that is assessable from and/or integrated within a container application according to example embodiments of the present disclosure, for example according to a "Shell" API. The "Shell" API can be configured to control and/or organize the manner in which the microapp(s) are located, displayed, and/or accessed in the container application. Various status icons can be included to convey current information about one or more statuses of the microapp, such as current settings, permissions, and the like. Thus, the "Shell" API can facilitate continuity in the "look and feel" of microapps that are accessible within the container application/platform. Further, providing the user with predictable and intuitive access to settings and/or permissions (e.g., globally or individually for each microapp) can improve the user's trust and comfort with the microapps.

Referring to FIG. 2, a general task flow can include a discovery stage 205, in which the user engages with the container application 204 to locate a microapp 202 that can provide a desired good and/or service, for example as described below with reference to FIGS. 6, 10A, and 10B. Next, during a conversation stage 207, the user can engage with the selected microapp 202, for example as described below with reference to FIGS. 7A through 9 and 13 through 17.

For example, referring to FIG. 2, a user can perform a search 208 within the container application 204 for a particular good or service in the "discovery" stage 205. The search can return a list of microapps 202 that are available for providing the requested good or service. The user can select a desired microapp 202 to view a storefront 210 of the selected microapp 202.

Next, in the "conversation" stage 207, the user can engage with the microapp 202 to customize and place an "order" within the storefront 210. An "order" can refer to a purchase of a good or service that involves subsequent delivery of the good or service. A "messaging" or "conversation" interface can be displayed in which updates can be provided in the form of messages. The "conversation" interface can provide an intuitive way of communicating a history of the user's interactions with the particular Microapp (e.g., including previous orders, updates, and the like).

The microapp 202 can interface with the container application 204 using the "Order" API. For example, the "Order" API can include a pre-defined "order card" template or standard, through which the microapp 202 can collect and communicate details of the order with through the container application 204, for example as described below with reference to FIGS. 13 through 17. The container application 204 can control how and when updates (e.g., notifications 206) are presented to the user (e.g., regarding the status of the order). In some embodiments, a frame 214 or navigation bar can be displayed that provides the user with controls and/or information with respect to the microapp 202.

In some embodiments, one or more additional access options or entry points, referred to as "Primers" 216, can be provided for accessing the microapp(s) 202. An example Primer 216 can include a link or code from a distinct computer application. For instance, a distinct computer application from a particular company can provide a direct link to open the container application and navigate directly to a microapp that was made by the company. The user can "scan" or photograph a visual code (e.g., bar code or QR code) associated with a product, service, and/or a specific microapp to access a list of microapps associated with the product/service and/or directly access the specific microapp.

As indicated above, the "microapp" 202 can be or include a lightweight application provided within or through a container application 204. Pre-defined guidelines established by the container application 204 can provide focused functionality. For example, pre-defined application programming interfaces (APIs) and/or software development kits (SDKs) can guide and/or constrain developers of the microapp 202 such that the microapp 202 can be accessed within and/or through the container application 204 in a pre-defined manner. This configuration can provide improved security compared with directly sending and/or receiving funds through third-party applications that are separate and distinct from the container application 204. The container application 204 can securely store the user's banking information and facilitate purchases, payment requests, and the like with the microapp 202, for example as described below with reference to FIGS. 7A through 9, without sharing the user's banking information with the microapp 202. Similarly, the container application 204 can securely store other user information, such as the user's preferred shipping address and/or user preferences for particular goods and services without sharing this information with the microapps 202. Thus, the container application/platform described herein can facilitate user engagement with third party microapps 202 in a manner that improves security.

According to aspects of the present application, the container application 204 and/or APIs can control aspects of the user experience to improve continuity of the user's experience across multiple microapps 202. For example, the container application 204 can control how notifications 206 from the microapp 202 are presented to the user (e.g., how "attention-grabbing" a specific notification 206 is allowed to be). The container application 204 can select a notification method (e.g., as a banner, alert, silent notification visible only when accessing the container application, etc.) based on the user's preferences and/or device setting (e.g., silent, do not disturb, ringer on, etc.). As another example, an "Order" API can include one or templates that control the arrangement and selection of information that can be displayed to the user, for example as described below with reference to FIGS. 13 through 17. Thus, the container application 204 can control how the microapps 202 present notifications 206 and/or updates to the user. As another example, the APIs can provide templates and/or pre-defined task flows to improve continuity in the user experience across different microapps 202 that can be accessed from the container application 204, for example as described below with reference to FIGS. 13 through 17.

Figure 3:
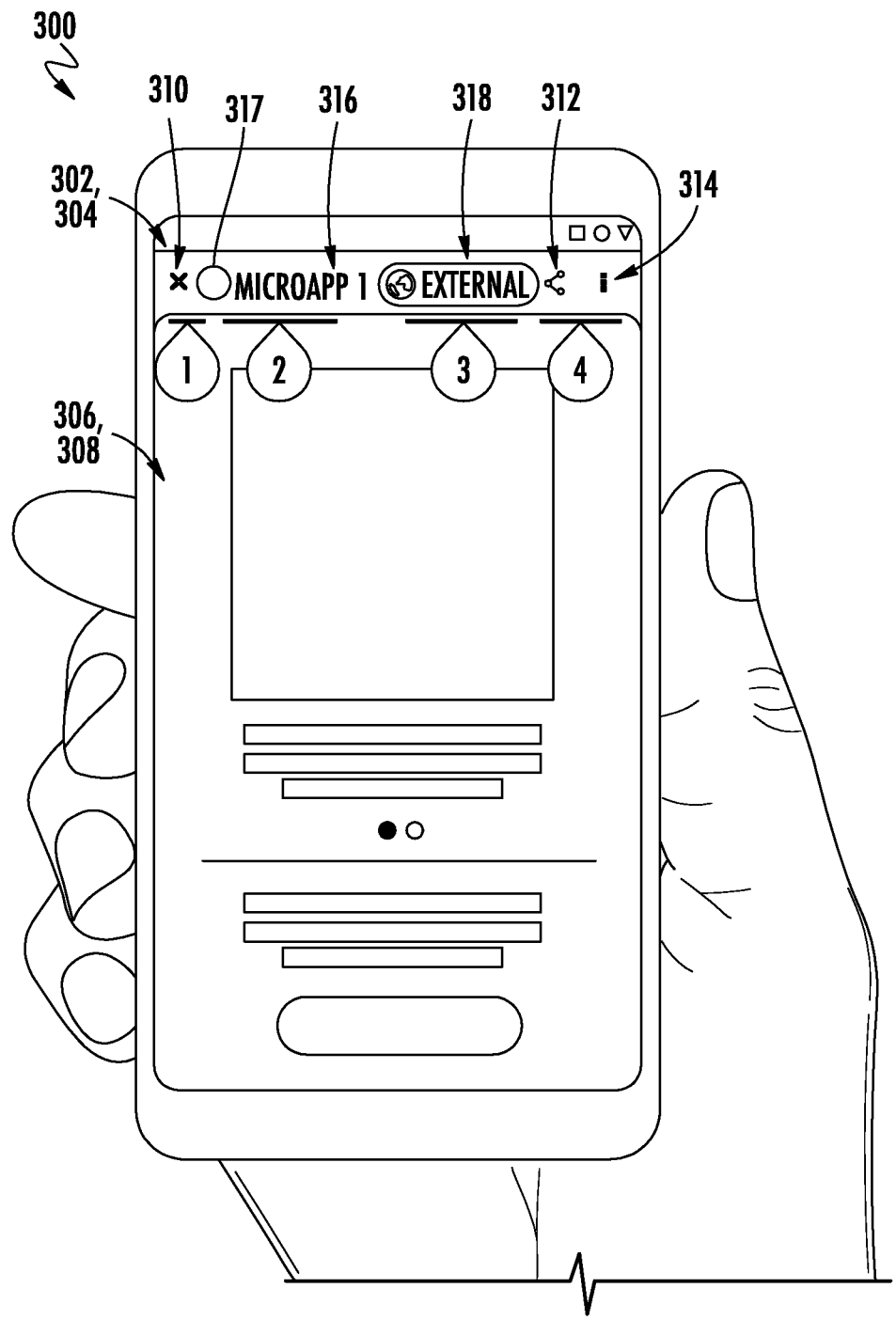
FIG. 3 depicts a user device displaying data received from a microapp within a navigation bar of the container application according to example embodiments of the present disclosure.

FIG. 3 depicts a user device 300 displaying data received from a microapp within a navigation bar 302 of the container application according to example embodiments of the present disclosure. The navigation bar 302 can be provided for displaying information about the microapp(s) and/or for providing the user with controls with respect to the present microapp and/or navigating with through other microapp(s). The navigation bar 302 can be displayed within a first panel 304 in a user interface 306. Data describing application output(s) received from the microapp(s) via one or more APIs can be displayed in a second panel 308 in the user interface 306.

The controls can include an exit icon 310 to allow the user to exit the microapp (e.g., to return to a main menu of the container application). The controls can include a share icon 312 for the user to share (e.g., on social media, by text message, by email, etc.) aspects of the user's experience with the microapp. As a further example, the navigation bar 302 can include an icon 314 for providing the user with additional controls and/or options. For example, the icon 314 may provide access with a settings panel to adjust settings for the particular microapp being access and/or general settings for all microapps that are accessible through the container application/platform. Thus, the navigation bar 302 can provide the user with controls with respect to one or more of the microapps.

The navigation bar 302 can display various information about the particular microapp that is being displayed via the container application. For example, the navigation bar 302 can display a microapp name 316 and/or icon 317 associated with the microapp. A navigation bar 302 can include a source indicator 318 that describes a source of the microapp (e.g., a company or brand associated with the microapp). For instance, the source indicator 318 can describe whether the microapp has the same source (e.g., same developer, same company, etc.) as the container application. In this example, the source indicator 318 indicates that the microapp is from a different source than the container application, which may alert the user to be more cautious with respect to that microapp. Conversely, the source indicator 318 can indicate that the microapp is from the same source as the container application. In such an event, the user may be more trusting or comfortable the microapp as the user may trust the source of the container application. Thus, the navigation bar 302 can provide information, including the name 316 and/or the source indicator 318, with respect to the microapp.

Figure 4A:
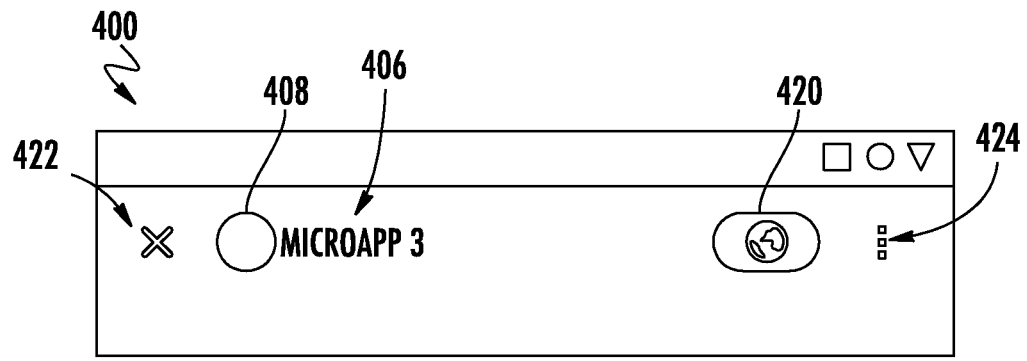
FIGS. 4A through 4C depict example navigation bars of the container application according to example embodiments of the present disclosure.
Figure 4B:
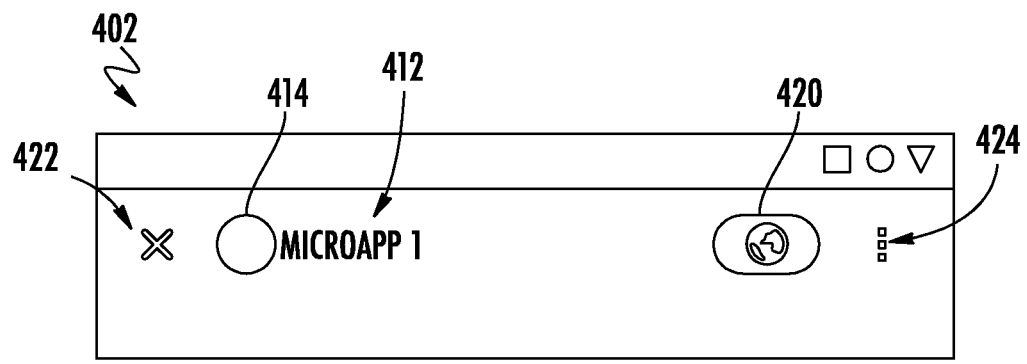
Figure 4C:
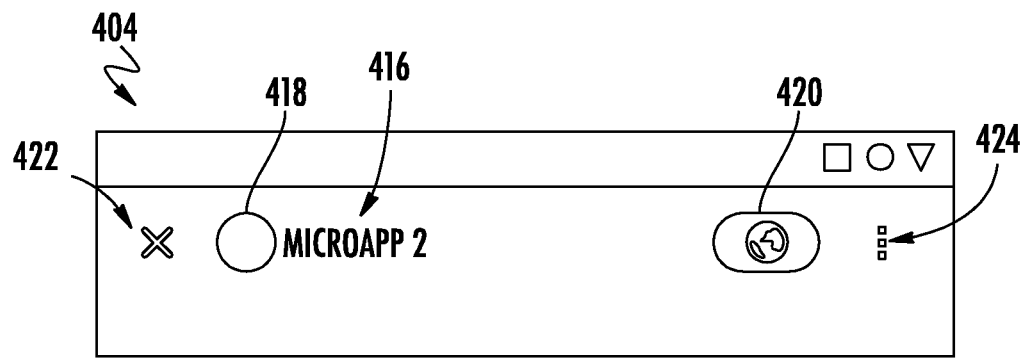

FIGS. 4A through 4C depict example navigation bars 400, 402, 404 according to example embodiments of the present disclosure. More particularly, example names and icons are shown in FIGS. 4A through C. Referring to FIG. 4A, the navigation bar 400 can include a microapp name 406 and icon 408. Referring to FIG. 4B, the navigation bar 402 can include another example microapp name 412 and icon 414.

Referring to FIG. 4C, the navigation bar 404 can include an example microapp name 416 and icon 418. The appearances of the navigation bars 400, 402, 404 can vary to visually indicate which microapp is being accessed. For example, the icons 408, 414, 418 can be representative of the respective microapp 406, 412, 416. Further a color, texture, shape, or other visual attribute of the navigation bar 400, 402, 404 can be customized based on the microapp.

Referring to FIGS. 4A though 4C, the navigation bars 400, 402, 404 can include respective source indicators 420. The respective source indicators 420 can indicate that the respective microapps are from different respective sources (e.g., are "external") from the developer of the container application. The navigation bars 400, 402, 404 can include respective exit icons 422 and "more" icons 424.

Referring to FIGS. 5A and 5B, in some implementations, the computing system can provide notifications or explanations associated with the source indicators. More specifically, referring to FIG. 5A, a notification 502 can provide additional information with respect to an "External" indicator 504. Referring to FIG. 5B, a notification 506 can provides additional information with respect to an "Internal" indicator 508.

Aspects of the present disclosure are directed to providing microapp developers with the ability to develop microapps in standard and/or non-proprietary programming languages. Microapps can be created (e.g., assembled, written, coded, etc.) using authoring tools that are publically available and/or framework agnostic. For example, JavaScript (JSS) for Cascading Style Sheets (CSS) can be used to develop the microapps using HTML. Thus, the platform described herein can provide for more accessible microapp development.

In some implementations, a variety of distinct software development kits (SDKs) can be provided that correspond with respective "use cases" or applications, such as different types of goods, services, delivery models, and the like. For example, distinct SDKs can respectively correspond with food delivery applications, tickets/passes ordering (e.g., electronically deliverable goods and services), social media applications, and so forth. These various SDKs can have differing API sets, permissions, and/or settings that are pre-configured or pre-defined based on the intended application and/or use case.

The permissions and/or security settings of the various SDKs can be pre-configured based on the intended use case of the SDK. For instance, an "electronic goods" SDK can be designed for microapps for ordering and delivering electronic items, such as e-tickets or e-passes. The "electronic goods" SDK can have pre-set permissions that prohibit the microapp from obtaining the user's current location, mailing address, etc. as this information is not typically necessary for purchasing and electronically receiving an e-ticket or e-pass. In this example, the pre-set permissions, however, may enable collecting the user's preferences with respect to movies, airlines, or the like (if the user has so consented).

As another example, a "physical goods" SDK for delivering food, consumer goods, and the like can have pre-set permissions that enable collecting geographical information about the user (e.g., the user's physical location, home address, work address or the like) if the user has so consented but prohibits collecting the user's preferences with respect to movies, airlines, or the like. Such preferences are not typically relevant to delivery of physical goods, such as food. Thus, the various SDKs can have different permissions depending on the intended use cases associated with the respective SDKs.

Similarly, the various SDKs can include differing sets of APIs that are appropriate for the intended "use case" or application of the SDK. For example, the example "physical goods" SDK described above may include the "sensor" API (also described above), for example for scanning a product code to shop for or learn more about a physical product. Conversely, the "electronic goods" SDK can exclude the "sensor" AP because access to the sensors (e.g., cameras and/or microphones) of the user device may not be useful or appropriate when purchasing an electronic ticket. It should be understood that the above-described examples of use-case SDKs are examples only. More specific and/or granular use cases are contemplated within the scope of this disclosure (e.g., a "coffee delivery" SDK, a "music purchasing" SDK, and so forth).

Thus, aspects of the present disclosure can improve the accessibility of the platform to microapp developers while still safeguarding against undesirable microapp features or activity (e.g., unwanted data collection and/or maliciously designed microapps). More specifically, the non-proprietary coding capability and/or compatibility described above can improve the platform's accessibility to developers. The use-case-specific SDKs can provide mechanisms for systematically protecting users by limiting capabilities (e.g., through permissions and/or APIs) of the microapps. In combination, these features can provide a robust platform for development of secure microapps.

Further the distinct SDKs can include differing preset permissions and/or security settings that are appropriate based on the respective intended use cases of the SDKs. For instance, an "electronic goods" SDK can be designed for microapps for ordering and delivering electronic items, such as e-tickets or e-passes, for example as described above with reference to FIGS. 14 through 17. The "electronic goods" SDK can have pre-set permissions that prohibit the microapp from obtaining the user's current location, mailing address, etc. as this information is not typically necessary for purchasing and electronically receiving an e-ticket or e-pass. In this example, the pre-set permissions, however, may enable collecting the user's preferences with respect to movies, airlines, or the like (if the user has so consented).

As another example, a "physical goods" SDK for delivering food, consumer goods, and the like can have pre-set permissions that enable collecting geographical information about the user (e.g., the user's physical location, home address, work address or the like) if the user has so consented but prohibits collecting the user's preferences with respect to movies, airlines, or the like. Such preferences are not typically relevant to delivery of physical goods, such as food (e.g., as described above with reference to FIGS. 6 through 7C). Thus, the various SDKs can have different permissions depending on the intended use cases associated with the respective SDKs.

As one example, a Shell" API can be configured to control and/or organize the manner in which the microapp(s) are located, displayed, and/or accessed in the container application, for example as described above with reference to FIG. 2.

As another example, a "Payment" API can be configured to control how financial transactions are conducted through the container application/platform and/or control aspects of the display of various information related with such financial transactions. The "Payment" API can control how, when, and where sensitive information is transmitted, such as financial details (e.g., banking information) and/or personal information (e.g., phone number, e-mail address, mailing address, etc.). For instance, container application can receive a transaction destination (e.g., data describing a bank account or the like) from a microapp via the "Payment" API. The payment applicant can then send a payment, payment request, or the like to the transaction destination without sharing the sensitive information with the microapp. Thus, the "Payment" API can provide increased security for the user as compared with entering the user's sensitive information directly into a multitude of applications outside of the container application/platform. The "Payment" API can also include features for sharing or splitting payments of items and/or for paying for items on the behalf of another user (e.g., as a gift to the user).

As yet a further example, a sensor API can be included that controls access and/or provides features with respect to sensors 124 (FIG. 1), such as camera(s) and/or microphone(s), of the user device by the microapp(s). For example, the sensors API can control when and/or how the microapp(s) may access the sensors. Such control can be based on user-adjustable settings within the container application/platform, for example in a control panel of the container application. The sensors API can further include one or more utilities that can perform operations based on data received from the sensors of the user device. As an example, the sensors API can include a scanning utility for visual codes (e.g., QR code, bar code, etc.) based on images received from the camera(s) 124 (FIG. 1) of the user device 102 (FIG. 1), for example as described above with reference to the "Primer" 216 of FIG. 2. As another example, the sensor API can facilitate voice recognition or analysis of audio received from the microphone(s) 124 of the user device 102. Thus, the sensor API can control and/or provide utilities or features for the microapps with respect to the sensors 124 of the user device 102.

As yet a further example, a connectivity API can be included that controls access to one or more types of wireless communications, including near field communication (NFC), Bluetooth, Wi-Fi, or other suitable types of communication. The connectivity API can control or provide access to such communication means based on the type of computer application, a location of the device 102, receiving credentials, and the like.

Figure 6:
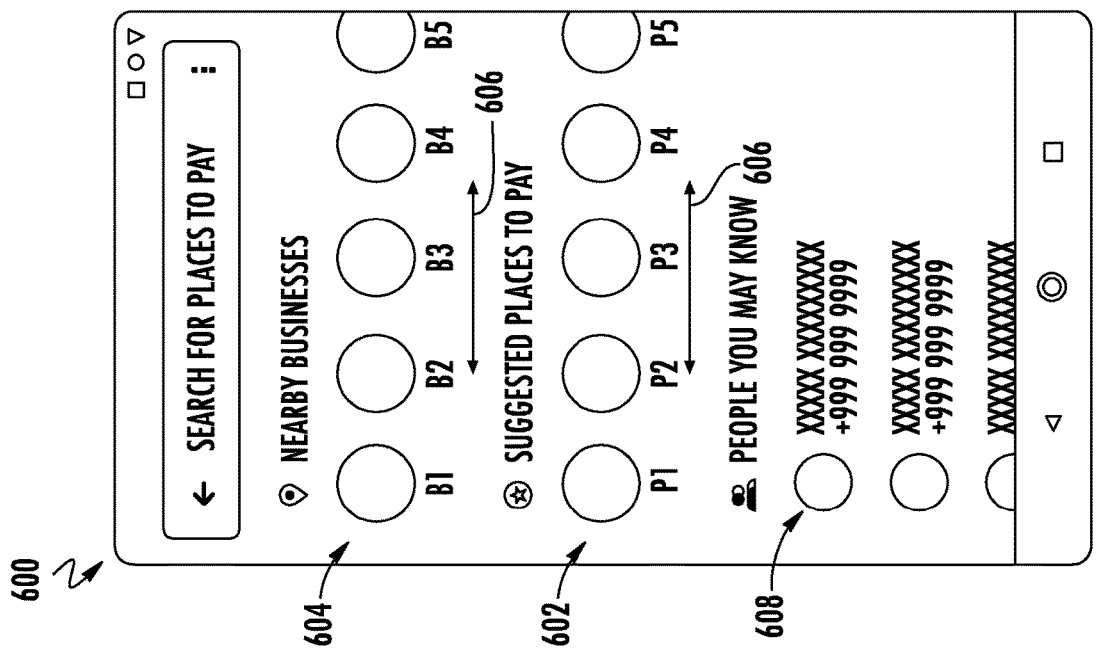
FIG. 6 depicts an example home screen of the container application in which the user can search for a microapp and/or business according to example embodiments of the present disclosure.

More specifically, FIGS. 6 and 7A through 7C depicts a series of views of a user device corresponding with the discovery stage and conversation stage described above with reference to FIG. 2 according to one or APIs (e.g., a shell API, orders API, payment API, and so forth). More specifically, FIG. 6 depicts an example home screen 600 of the container application according to example embodiments of the present disclosure, which can correspond with the discovery stage described above with reference to FIG. 2. A plurality of microapps can be accessible from the container application. The user can navigate through lists and/or a menu structure from the home screen 600 to locate a desired microapp. For example, the home screen 600 can suggest microapps 602 and/or suggest nearby business 604 offering services for which the user can locate associated microapps. The user can scroll through the indicators (e.g., as illustrated by arrows 606) to locate the desired microapp or category of microapps (e.g., based on the type of goods or services associated with the microapp). Thus, the container application can provide the user with an ability to navigate multiple microapps to locate a specific, desired microapp.

In some implementations, the nearby businesses 604 can locate and/or microapps 602 can be selected based on the user's location and/or preferences. For instance, the user can be notified that coffee can ordered from a favorite coffee shop when the user is nearby one of the coffee shop's locations. The container application can suggest an appropriate microapp, such as a microapp released by the coffee shop or a more general coffee or food ordering microapp. Additional information can optionally be included about the services and/or stores, such as a distance to the location of the store and/or service location, a time until the service can be provided (e.g., a movie show time, time until a meal can be ready once ordered, etc.). The user can select one of the microapps and complete the transaction form within the container application. Thus, the container application can help the user search for and locate a relevant microapp based on the user's location and/or preferences.

In some implementations, the home screen 600 can also provide a list 608 of user contacts and/or people that the user may know. This list 608 can facilitate social aspects of the present disclosure, such as sharing of completed transactions, paying for services on behalf of another user (e.g., as a gift).

Figure 7A:
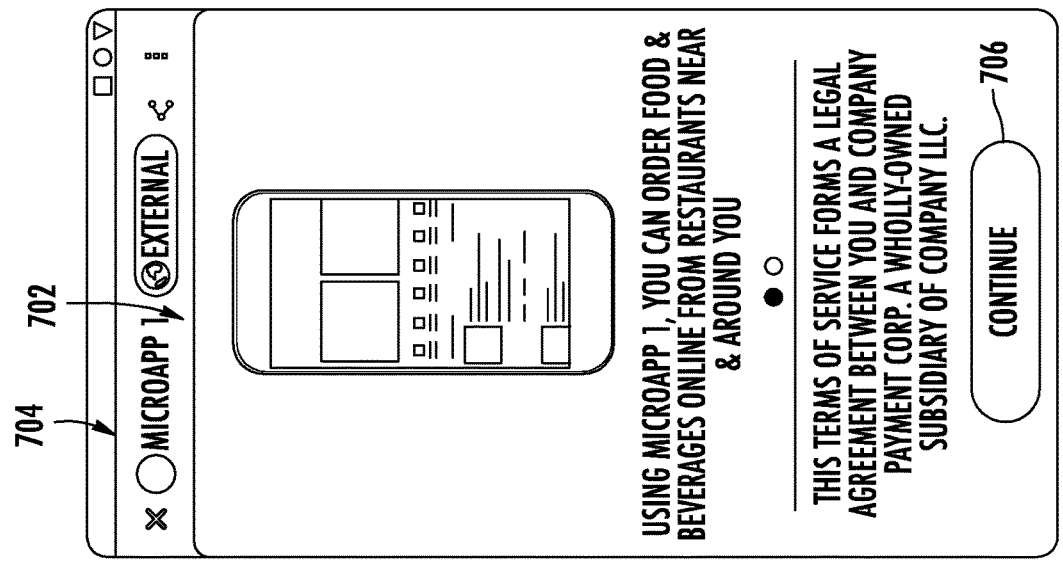
FIGS. 7A through 7C depicts a series of views of a user device displaying data received from a microapp with a navigation bar of the container application according to example embodiments of the present disclosure.
Figure 7C:
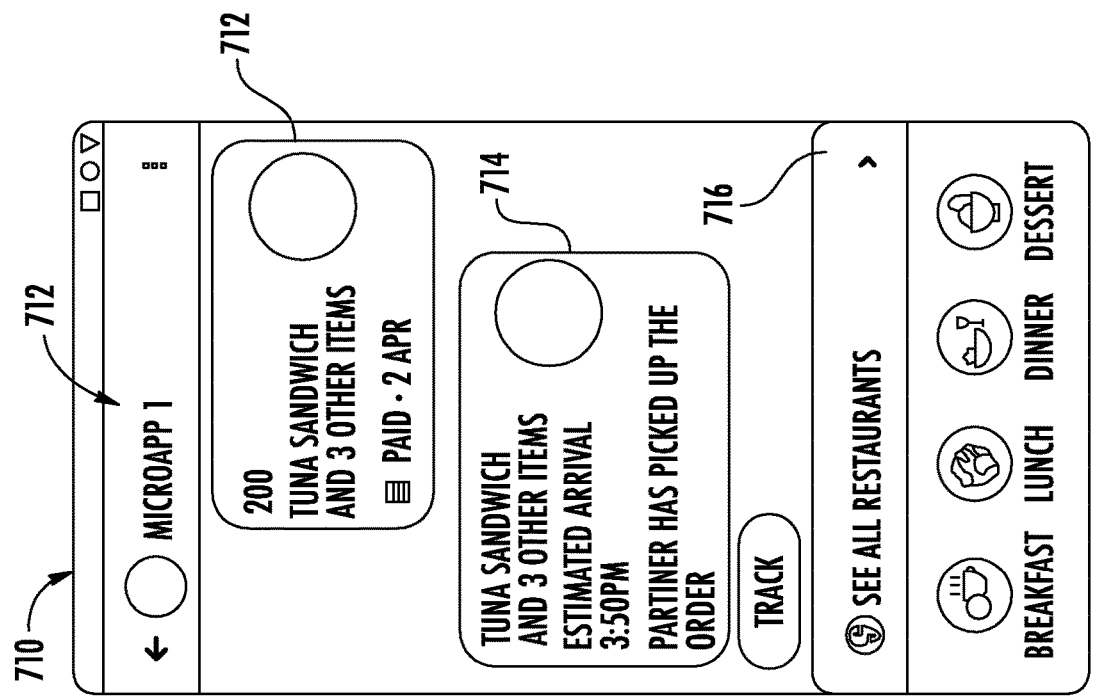
Figure 7B:
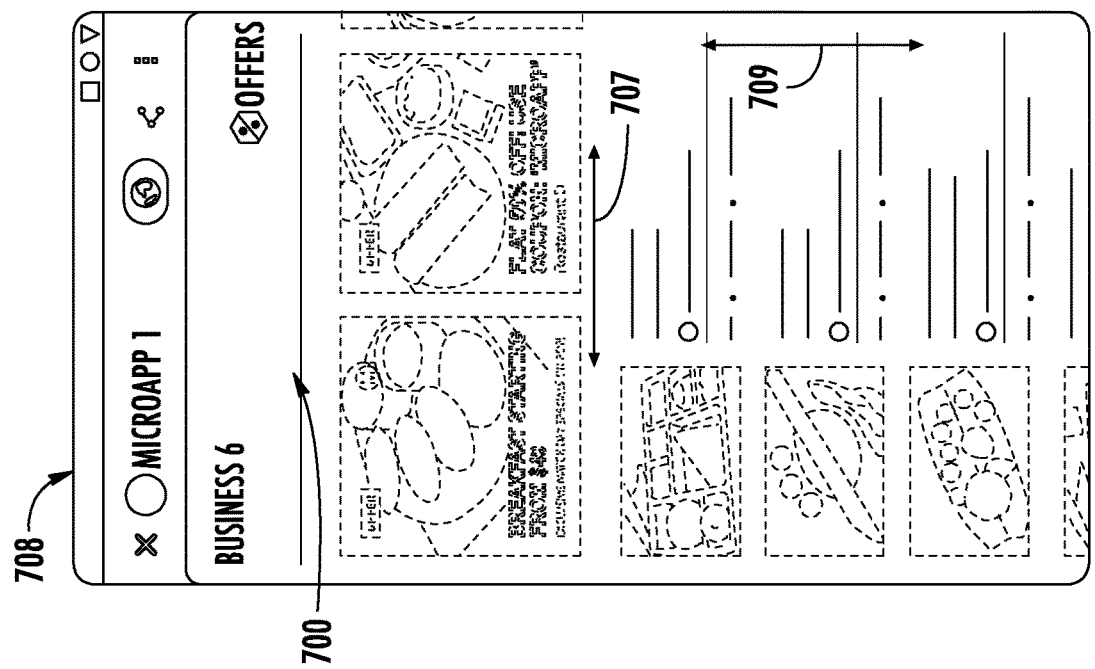

FIGS. 7A through 7C depicts a series of views of a user device displaying data received from a microapp with a navigation bar of the container application according to example embodiments of the present disclosure. Referring to FIG. 7A, once a user has selected a microapp, for example from the home screen 600 described above with reference to FIG. 6. A welcome screen 702 can be displayed based on data received from the microapp. A navigation bar 704 or "frame" can be displayed, for example as described above with reference to FIGS. 3 though 4B. The welcome screen 702 can include information describing the goods and/or services offered by the microapp and/or the process for ordering such goods and/or services. The user can click a continue button 706 to access offers for goods and services within the microapp.

FIG. 7B illustrates a second view 708 of a user device displaying a "storefront," based on data received from the microapp and according to an API. In this example, the user can view offers for food delivery from various restaurants including various details with respect to the offers. The user can scroll through the various offerings (e.g., as indicated by arrows 707, 709).

FIG. 7C illustrates a third view 710 of a user device displaying data received from the microapp and a navigation bar 711 according to aspects of the present disclosure. More specifically, the microapp can provide updates 712, 714 with respect to an order (e.g., food order) placed by the user, for example as described below with respect to the "Orders" API described below with reference to FIGS. 13 through 17. The third view 710 of the user device can also include additional offers 716 or categories of offers from the microapp.

Figure 8:
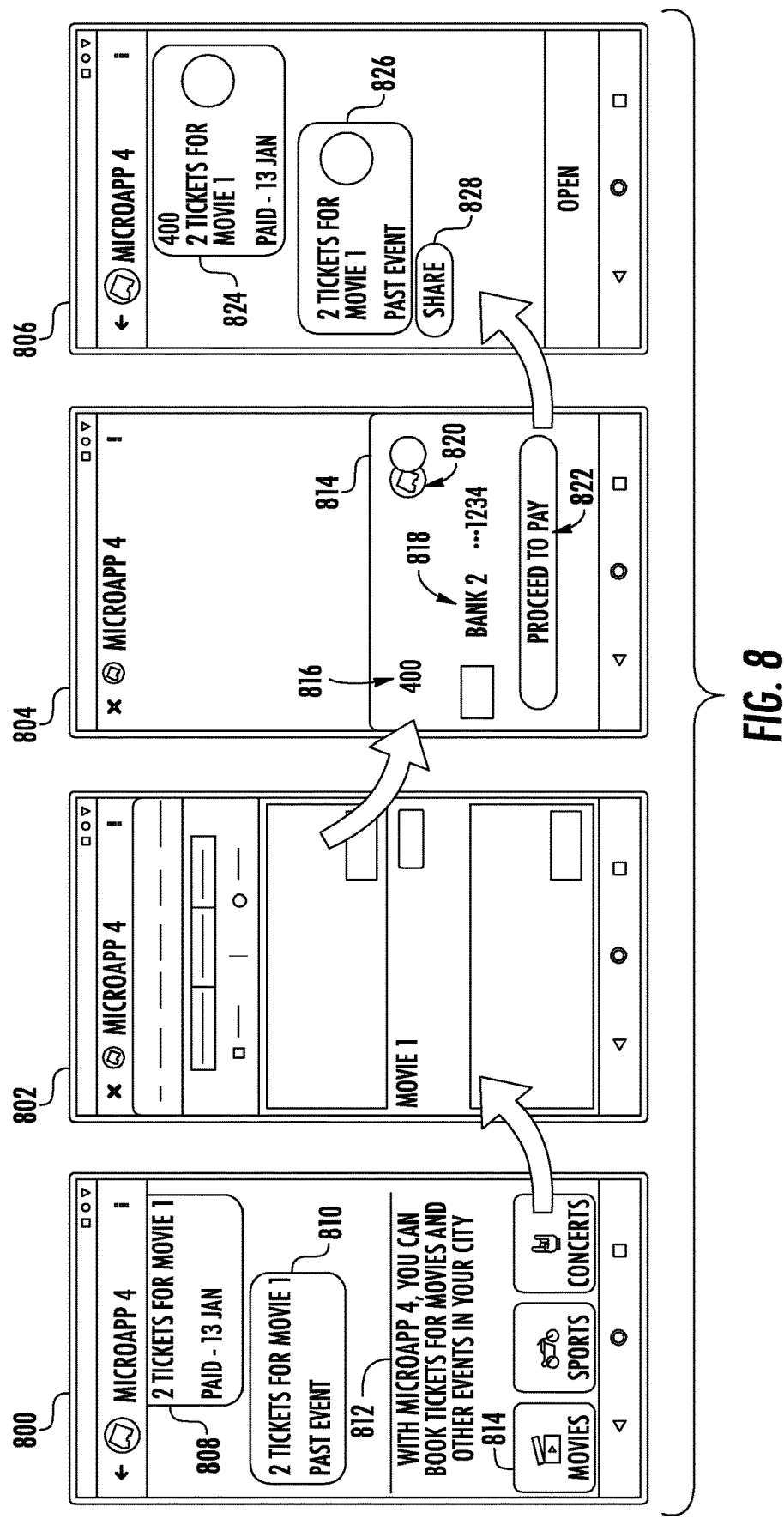
FIG. 8 depicts a series of sequential views of a user device in which a user can engage with a microapp and order a service with the microapp according to example embodiments of the present disclosure.

FIG. 8 depicts a series of sequential views 800, 802, 804, 806 of a user device in which a user can engage with a microapp and order a service with the microapp according to example embodiments of the present disclosure. In view 800, a "messaging" or "conversation" interface can be displayed in which updates can be provided in the form of messages. The "conversation" interface can provide an intuitive way of communicating a history of the user's interactions with the particular Microapp (e.g., including previous orders, updates, and the like).

In this example, a previous "conversation" with a ticket booking microapp is displayed. The previous messages 808, 810 can indicate that the user previously purchased tickets for a particular movie. A list 812 of categories of available offers is also displayed including Movies, Sports, and Concerts. If the user selects "Movies" 814 from the list 812, currently available movie ticket offerings can be displayed in view 802 of a "storefront." The offerings include the particular movie based on the user's previous purchase of tickets to see this particular move. The user can select particular movie to purchase tickets again for this move. Additional information such as show times, theater locations, and the like can be displayed along with the movie titles.

In view 804, a panel can include details about the transaction, such as the purchase amount 816, the source of funds 818, and the user profile and/or microapp 820 that is associated with the transaction. The user can select to pay using a pay button 822.

In view 806, additional messages 824, 826 can be displayed showing the status of the order and/or providing an option to "share" the order via a share button 828. For example, the user can communicate with other users or contacts through the container application. For example, the user can share the recently completed event, such as a completed payment, payment request, or the like. The user can share the recently completed event directly with a contact of the user and/or "post" the completed event on social media or the like. The content and/or format of the additional messages 824, 826 can be defined according to the "Order" API described with reference to FIGS. 13 through 17.

Figure 9:
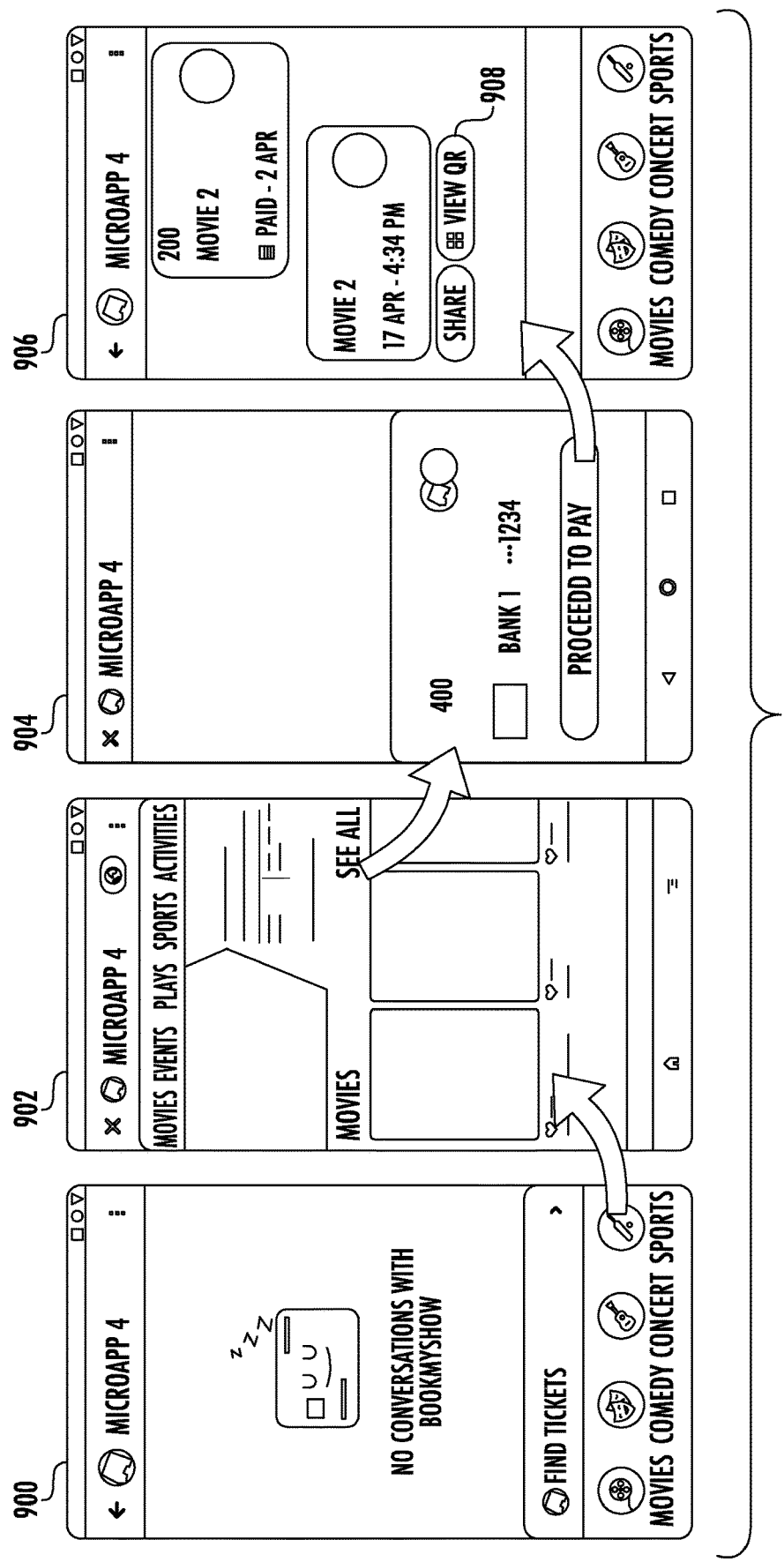
FIG. 9 depicts a series of sequential views of a user device in which a user can engage with a microapp and order a service with the microapp according to example embodiments of the present disclosure.

FIG. 9 depicts a series of sequential views 900, 902, 904, 906 of a user device in which a user can engage with a microapp and order a service with the microapp according to example embodiments of the present disclosure. A second view 902 can be considered a "storefront" and the display of information in the storefront can be controller via one or more APIs. This example sequence of views 900, 902, 904, 906 is similar to FIG. 8 except that view 900 is free of any previous conversation, as compared with view 800 of FIG. 8. Additionally, in this example a "View QR" button 908 may be displayed in view 906. In response to the user selecting the "View QR" button 908, the user device can display a QR code associated with the transaction. Another user can take a photo of the QR code and to access the same microapp, for example to purchase the tickets to the same movie and time.

Figure 10B:
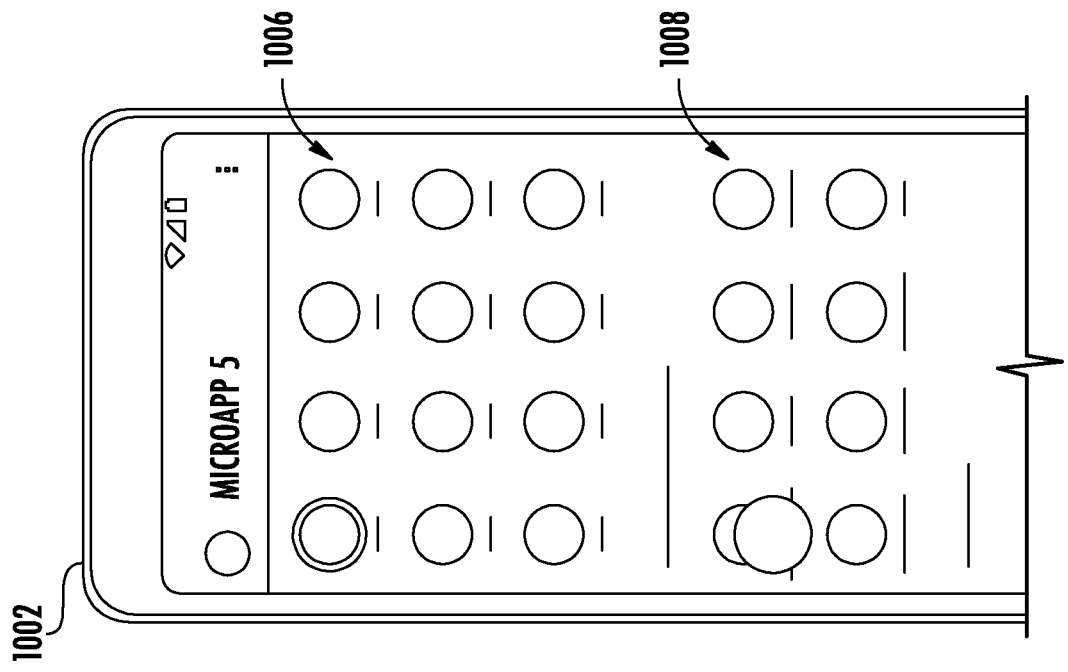
FIGS. 10A and 10B depict example views of a user interface in which the user can search for a microapp and/or business according to example embodiments of the present disclosure.
Figure 10A:
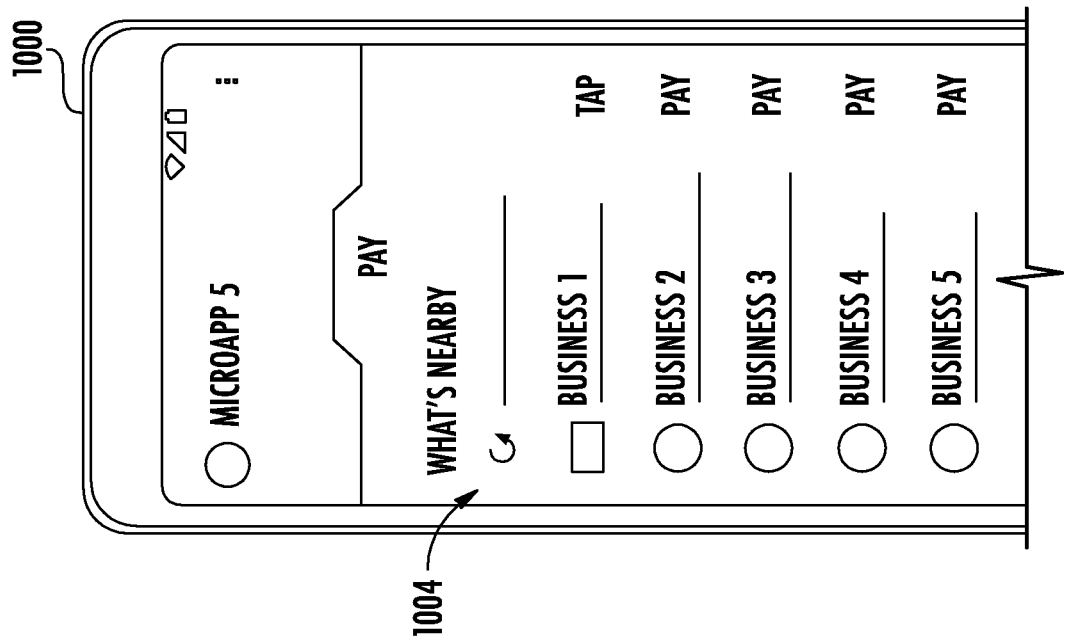

FIGS. 10A and 10B depict example views 1000, 1002 of a user interface in which the user can search for a microapp and/or business according to example embodiments of the present disclosure, for example corresponding with the "discovery" stage described above with reference to FIGS. 2 and 6. More specifically, the view 1000 of FIG. 10A shows an example list 1004 of nearby businesses for which the user can order services through one or more microapps. Additional information, such as promotional information, can be provided with the nearby businesses. The view 1002 of FIG. 10B shows a list of user contacts 1006 and suggested businesses 1008. As indicated above, the suggestions 1004, 1006, 1008 can be based on the user's location and/or preferences.

Figures 11A, 11B, 11C:
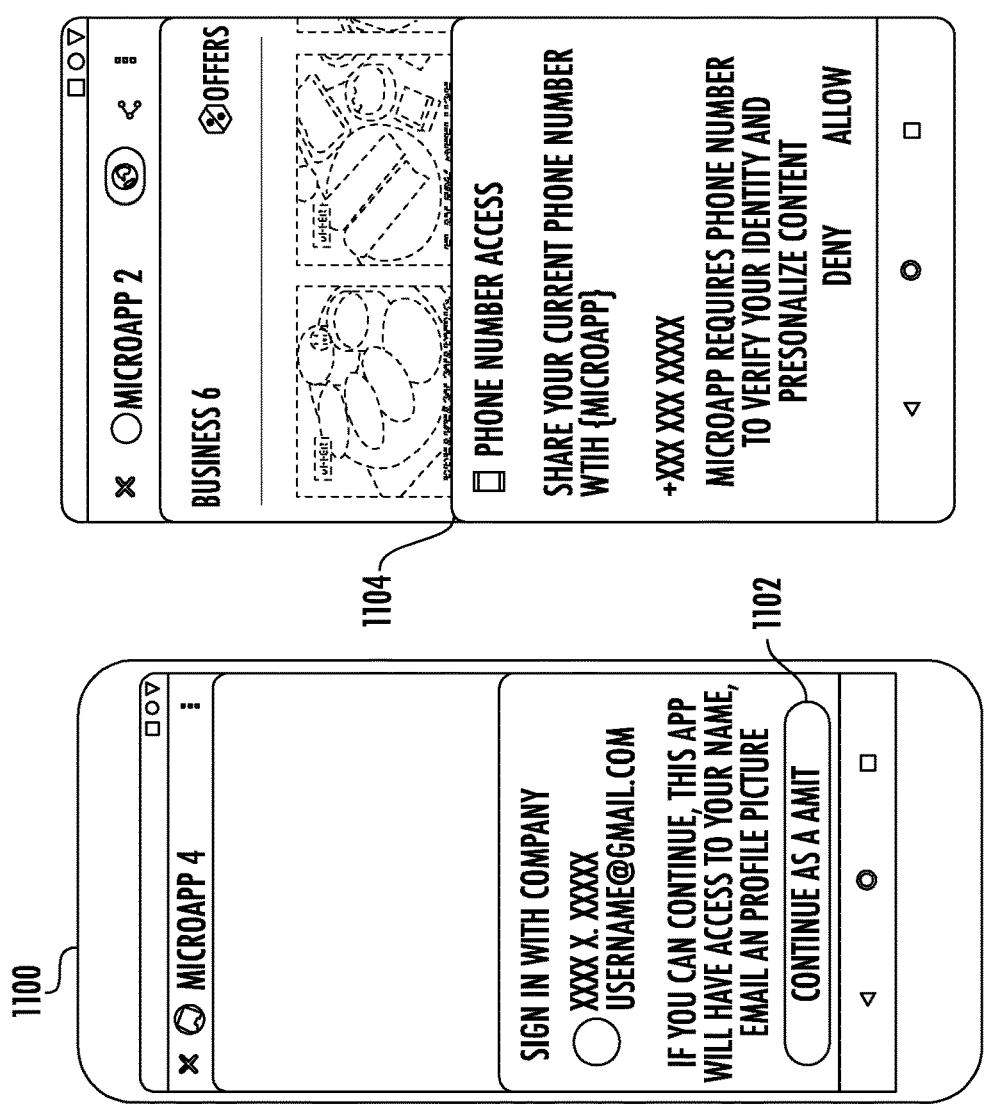
FIG. 11A depicts the container application verifying an identity of a user of the computing device based on a user account of the user associated with the container application.
FIG. 11B depicts a display window in which the user can control whether the microapp(s) can access the user's phone number according to aspects of the present disclosure.
FIG. 11C depicts a display window in which the user can control whether the microapp(s) can access the user's location according to aspects of the present disclosure.

Referring to FIG. 11A, the container application can verify an identity of a user of the computing device based on a user account of the user associated with the container application. More specifically, a user interface 1100 is depicted in FIG. 11A, in which the user can "log into" a pre-existing account that is accessible from the container application. The container application can verify the identity of the user by accessing the pre-existing account of the user to "log the user into" a selected microapp. For instance, the user can select "Continue as [user name]" 1102 to log in with the pre-existing account. Thus, the container application can facilitate user identification and/or verification for multiple microapps such that the user does not have to create individual log-in credentials and/or accounts for each microapp.

Referring to FIGS. 11B and 11C, the container application can allow the user to control what user information the microapp(s) can access. More specifically, the container application display a settings panel 1104 that prompts the user to indicate whether the specific microapp is allowed to access the user's phone number and/or a settings panel 1106 that prompts the user to indicate whether the specific microapp is allowed to access the user's current location. Thus, the container application can facilitate user control over what user information the respective microapps can access.

Referring to FIGS. 12A and 12B, in some implementations, the container application and/or microapp(s) (e.g., through the container application) can prompt the user with suggestions or reminders. More specifically, referring to FIG. 12A, the container application can remind the user of balances in the user's account with an option to "top up" 1202 or deposit funds in the user's account. Additional options can include a button 1204 to access a website or button 1206 to contact a customer service person associated with a user's account or a microapp. Referring to FIG. 12B, the container application can provide a message 1208 suggesting a purchase of an item based on the user's previous purchases. For example, the message 1208 can suggest a purchase of the user's "usual" (e.g., a previously ordered chocolate cake). For example, a previous message 1210 can include details about the previous order (e.g., the amount paid and date of transaction). The message 1208 suggesting the purchase can have an "order" button 1212 and/or an "edit cart" button 1214 for the user to re-order the previously ordered item and/or add it the user's "cart." In some implementations, the container application and/or platform can leverage one or more machine-learned models to aid in generating such suggestions or reminders.

Figure 13:
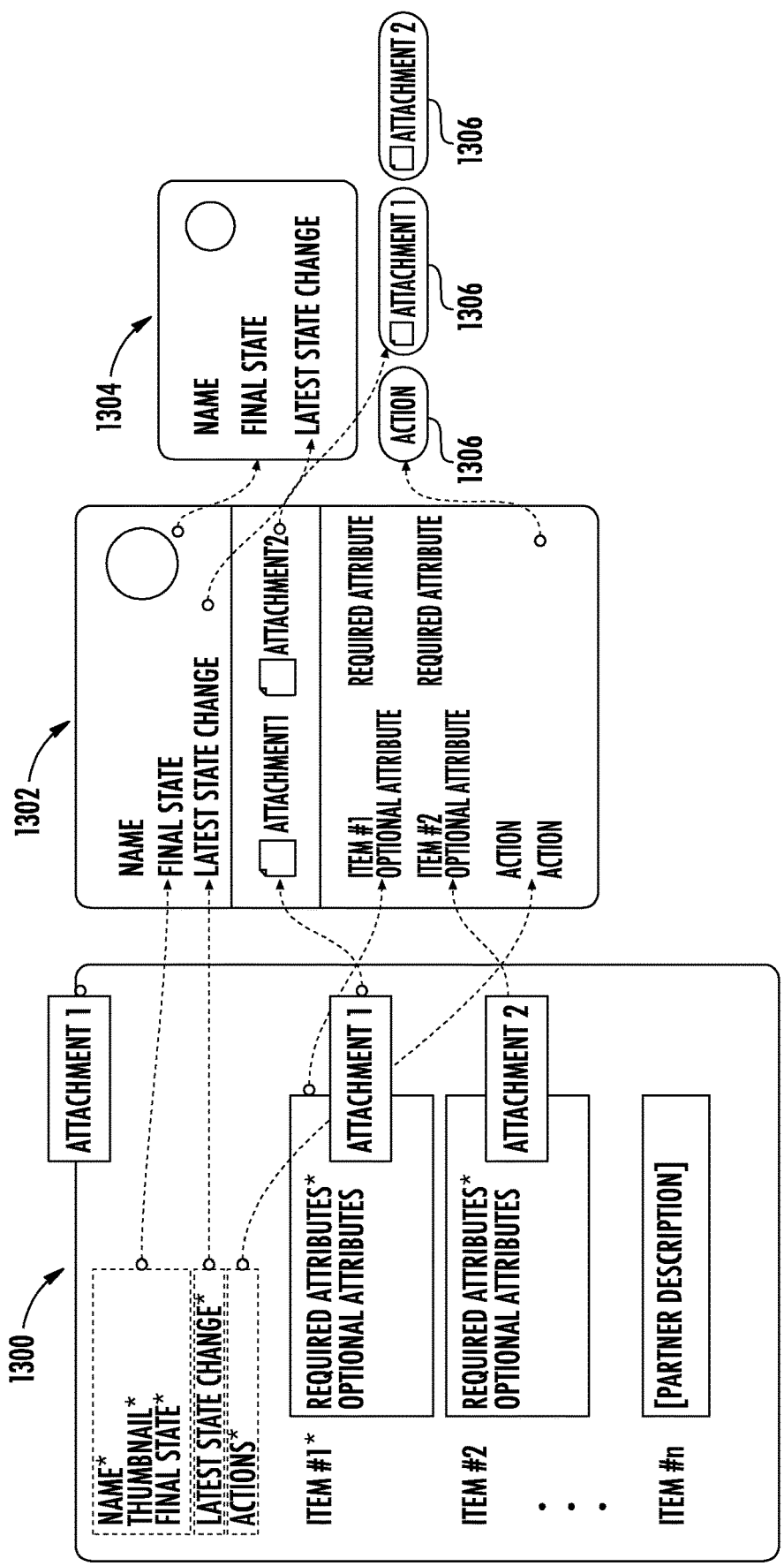
FIG. 13 depicts a simplified schematic diagram of an "Order" API framework including several templates according to example embodiments of the present disclosure.

As indicated above, the container application/platform can provide a number of specialized APIs for developers. Referring to FIG. 13, as one example, an "Orders" API can be provided that streamlines and standardizes procedures processing and presenting orders and/or offers of goods and/or services to the user within the container application and microapp. Before a transaction is completed, the "Orders" API can define a first set template and/or set of rules with respect to how offers, messages, customer support messages, and the like may be presented to the user. Once the user has selected the goods, services and/or customized options associated with the good and/or service, the "Orders" API can facilitate completion of the transaction. After the transaction is completed, the "Orders" API can control how confirmations, status updates (e.g., tracking, delivery status, etc.), deliverables (e.g., itinerary, tickets, passes), and the like are stored, shared, or otherwise manipulated by the user. Thus, the "Orders" API can improve continuity of the user's experience across multiple microapps when placing orders through the container application/platform.

For instance, referring to FIG. 13, a first template 1300 is illustrated in which a variety of placeholders are provided. The placeholders can include required attributes, optional attributes, and/or attachments for some or all of the items. Referring to a second template 1302 a first display of the information can be pre-defined, including locations, arrangements, and the like with respect to the information stored in the placeholders. A third template 1303 can define a second set of locations for display of such information and/or for buttons 1306 for performing actions with respect to the information of the placeholders.

Figure 14:
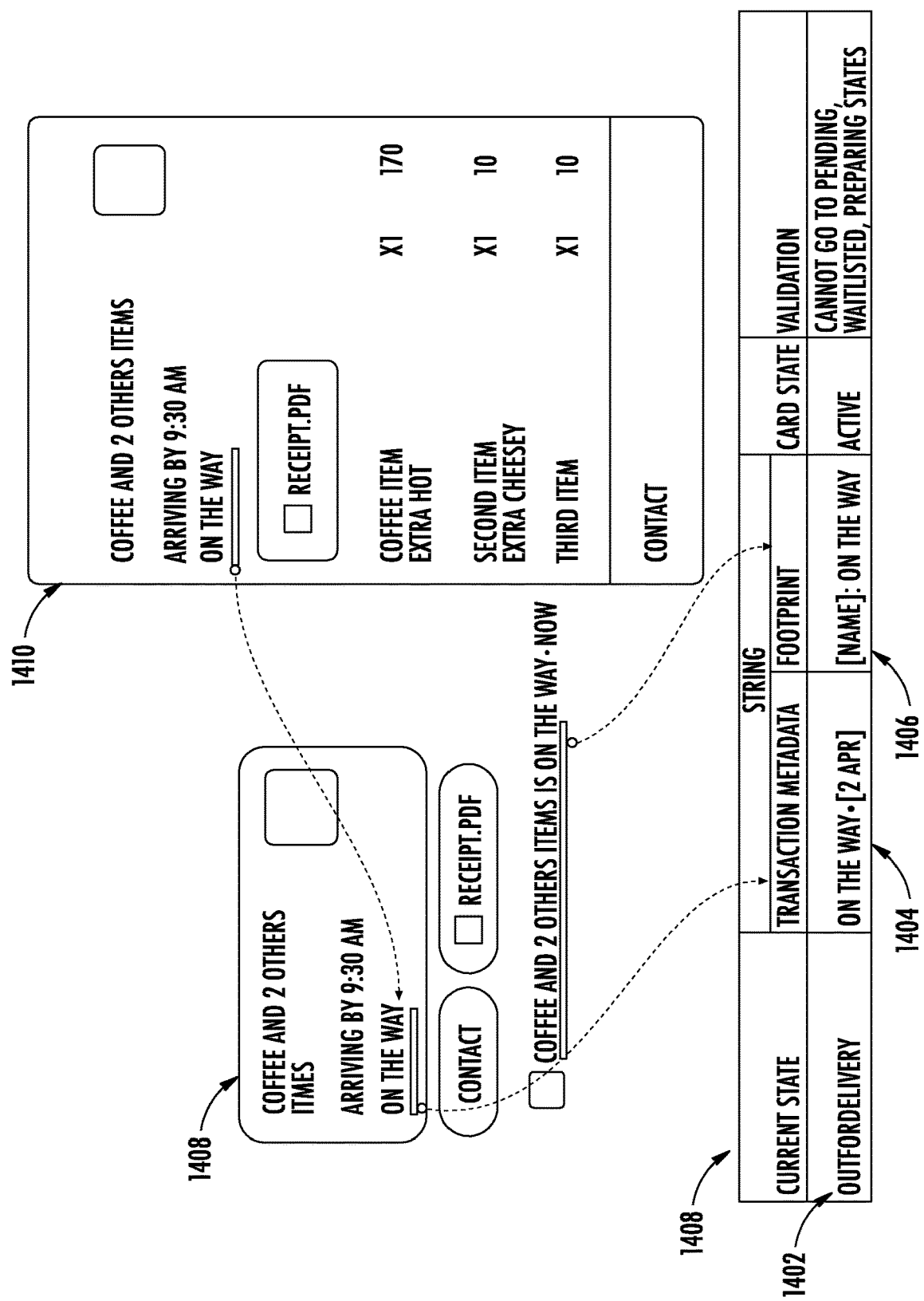
FIG. 14 depicts another simplified schematic diagram of the "Order" API framework including several templates according to example embodiments of the present disclosure.

Referring to FIG. 14, a table 1400 can include a pre-defined variety of states, transaction metadata, footprints, card states, and/or validations. As an example, a pre-defined state 1402 of the order can include "Out for delivery." The transaction metadata 1404 and/or footprint 1406 can include pre-defined templates for how data describing the pre-defined state 1402 (e.g., "order states") can be displayed.

The "Order" API can include rules (e.g., "validation") defining how states of the order can change. For example, the rules can specify which order states can and cannot follow other order states. In this example, the status "Out for delivery," cannot be followed by "pending," "waitlisted," and "preparing" statuses. It should be understood that these are merely example order states and an example rule regarding the order states.

Additional pre-defined templates can be provided for display of such information for specific contexts. For example, a pre-defined message template 1408 and/or a pre-defined receipt template 1410 can be defined for display of the information.

Figure 15:
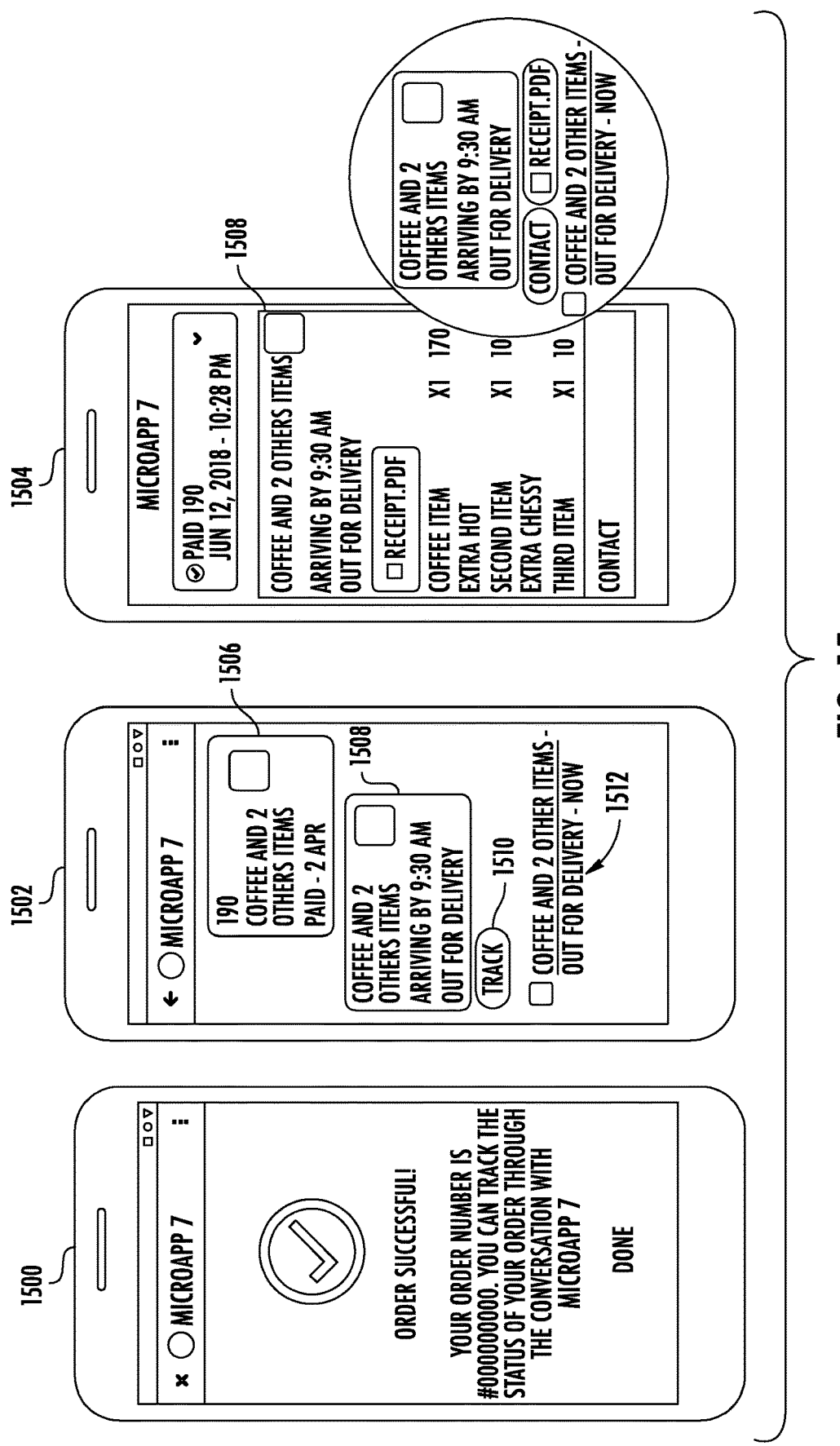
FIG. 15 depicts a series of sequential views of a user device implementing an example "Order" API according to aspects of the present disclosure.

FIG. 15 depicts a series of sequential views 1500, 1502, 1504 of a user device implementing an example "Order" API according to aspects of the present disclosure. The first view 1500 shows an order confirmation after a user has completed a transaction. In the second view 1502, messages 1506, 1508, buttons 1510, and/or notifications 1512 can be displayed according to an "Order" API, for example as described above with reference to FIGS. 13 and 14. In a third view 1504, a receipt 1508 can be displayed according to the "Order" API (e.g., the pre-defined receipt template 1410 described above with reference to FIG. 14).

Figure 16:
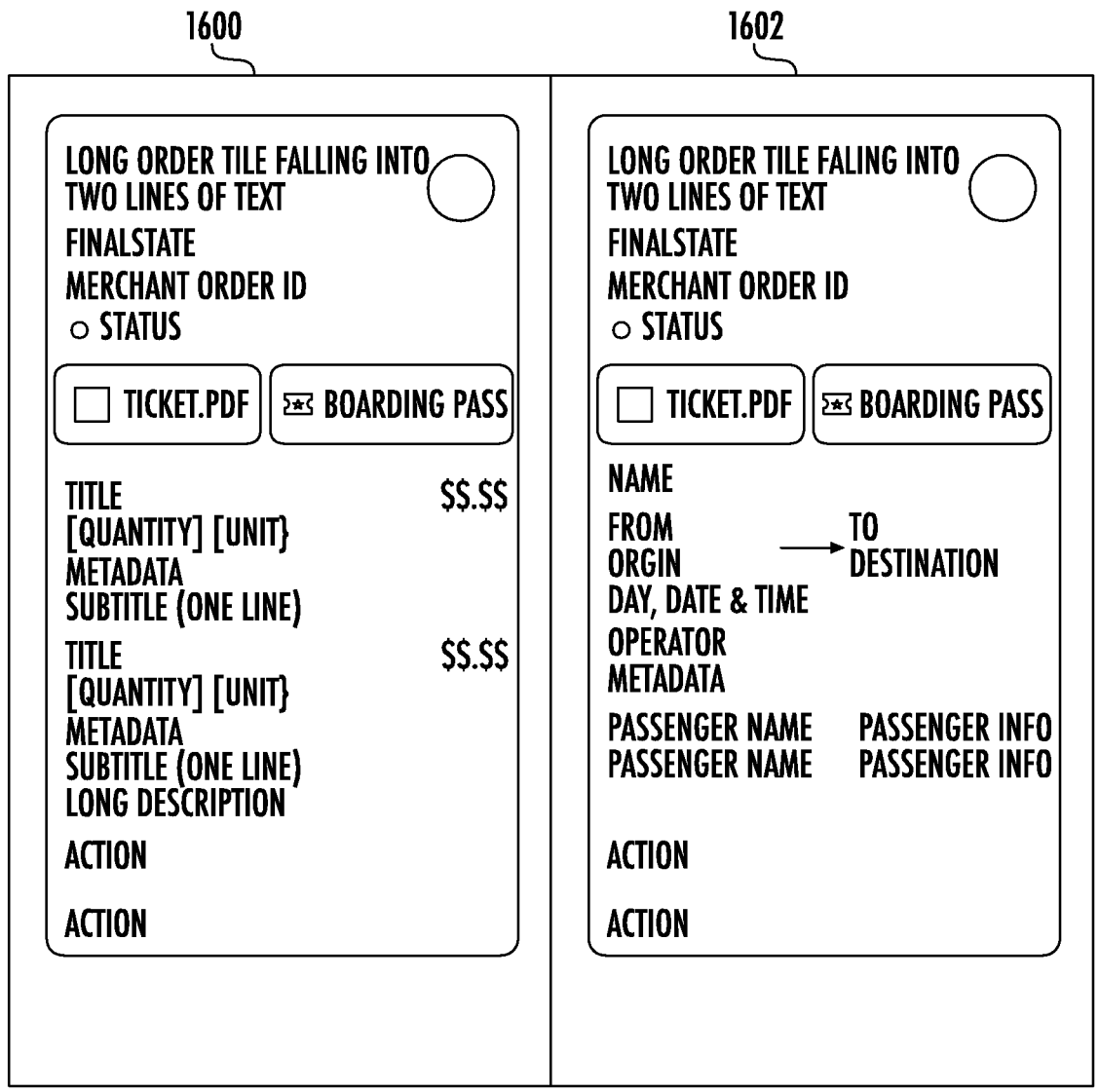
FIG. 16 depicts example pre-defined templates for display of electronic goods such as e-passes (e.g., boarding passes, tickets, and the like).
Figure 17:
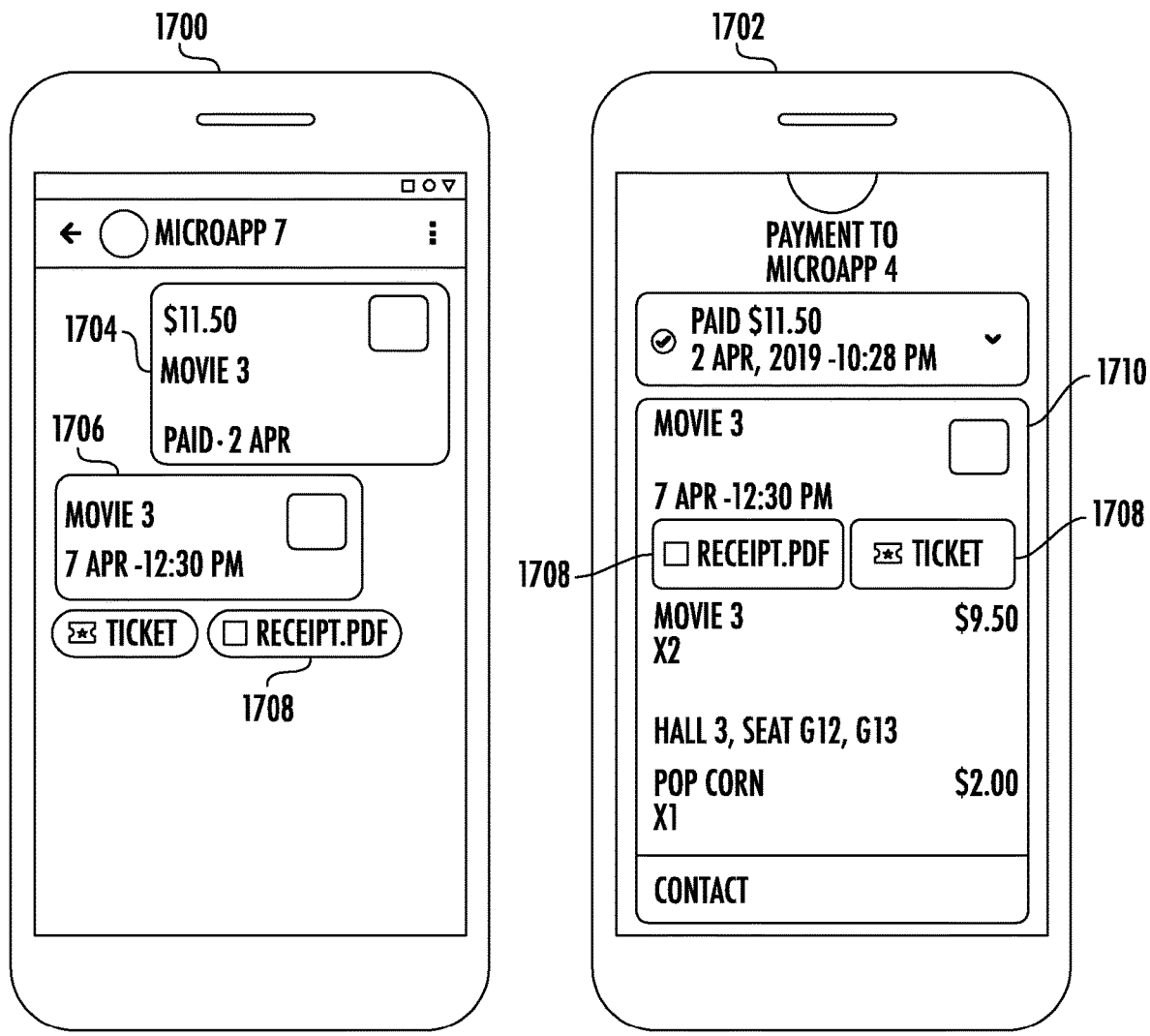
FIG. 17 depicts additional views of the user device displaying messages, buttons, and a receipt according to the "Order" API.

FIG. 16 depicts example pre-defined templates 1600, 1602 for display of electronic goods, such as e-passes (e.g., boarding passes, tickets, and the like). Such pre-defined templates 1600, 1602 can be included in the "Order" API and/or as separate APIs (e.g., an "electronic goods" API). FIG. 17 depicts additional views 1700, 1702 of the user device displaying messages 1704, 1706, buttons 1708, and a receipt 1710 according to the "Order" API.

As indicated above, a variety of distinct software development kits (SDKs) can be provided that correspond with respective "use cases" or applications. The various SDKs can include differing sets of APIs and/or different varieties of APIs that are appropriate for the respective "use cases."

Aspects of this application are also directed to providing feedback (e.g., in the form of reports or statistics) and/or facilitating troubleshooting with developers of the microapps if the user has so consented. For example, the container application can collect information about how the user engages with the various microapps in different situations or scenarios. The microapp developers can use this information to improve the microapps. As another example, the microapp developers can setup automatic alerts for specific types of errors or user behavior. For instance, an "automated check" can be implemented to note each time a user engages with the microapp (e.g., to certain level or stage in a pre-defined process or flowchart) but does not complete the financial action (e.g., purchase, payment request, etc.). As a further example, the microapp developer can define particular user feedback questions and/or prompts to be presented within the microapp. These features can be provided within a developer portal for the container application. Thus, aspects of this application will be directed to improving the developers' experience.

Example Methods

Figure 18:
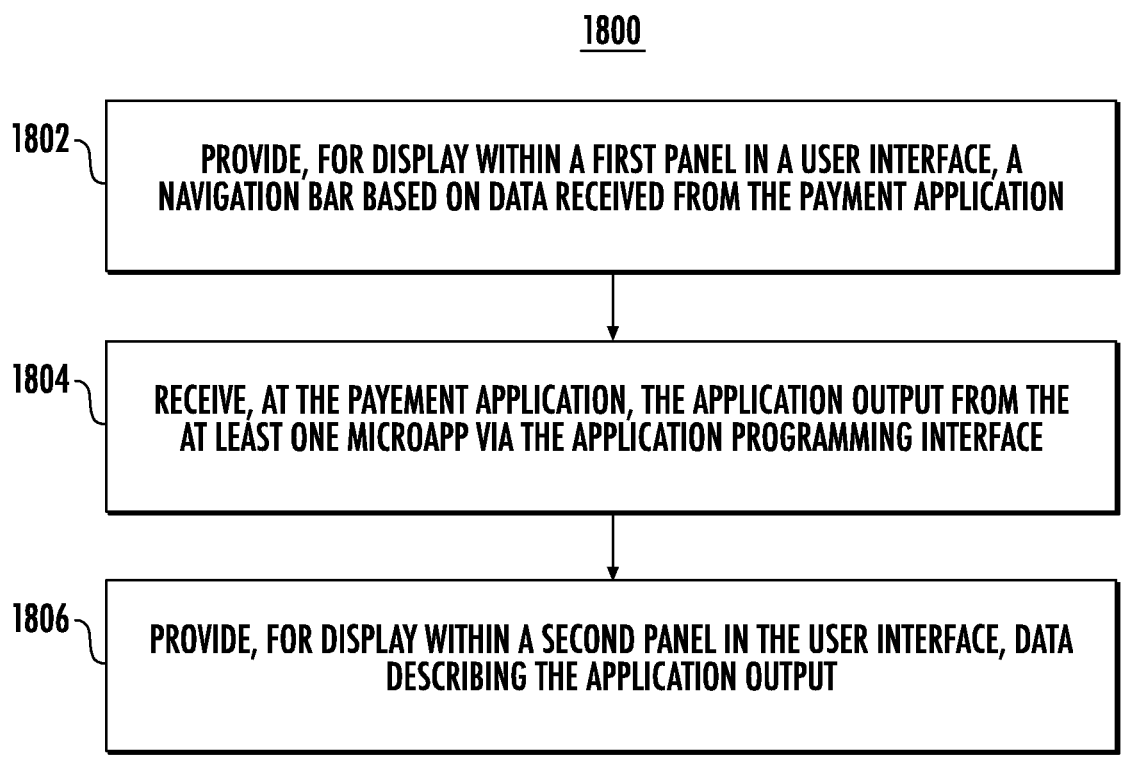
FIG. 18 depicts a flowchart of an example method for integrating a microapp into a container application according to aspects of the present disclosure.

FIG. 18 depicts a flow chart diagram of an example method for integrating microapps into a container application and/or platform according to example embodiments of the present disclosure. Although FIG. 18 depicts steps performed in a particular order for purposes of illustration and discussion, the methods of the present disclosure are not limited to the particularly illustrated order or arrangement. The various steps of the method 1800 can be omitted, rearranged, combined, and/or adapted in various ways without deviating from the scope of the present disclosure.

At 1802, a computing system can be configured to provide, for display within a first panel in a user interface, a navigation bar based on data received from the container application, for example as described with reference to FIGS. 3 through 7C. The navigation bar can be displayed with in a touch-sensitive display screen 122 of a user computing device 102 (e.g., a smartphone). The container application can be stored in the memory 114 and executed by one or more processors 112 of the user computing device 102 and/or in the memory 134 of the server computing system 130 and executed by the processor(s) 132 of the server computing system 130.

At 1804, the computing system can be configured to receive, at the container application, the application output from the at least one microapp via the application programming interface. For example, the microapp can communicate with the container application via an "Order" API as described with reference to FIGS. 13 to 17, a "Shell" API, a "Payment" API, and so forth. The APIs can be stored in the memory 114 and executed by one or more processors 112 of the user computing device 102 and/or in the memory 134 of the server computing system 130 and executed by the processor(s) 132 of the server computing system 130.

At 1806, the computing system can be configured to provide, for display within a second panel in the user interface, data describing the application output. The application output can include information about a recently placed order can be displayed according to one or more of the APIs. For example, information can be displayed according to one or more of the pre-defined templates described above reference to FIGS. 13 to 17.

Figure 19:
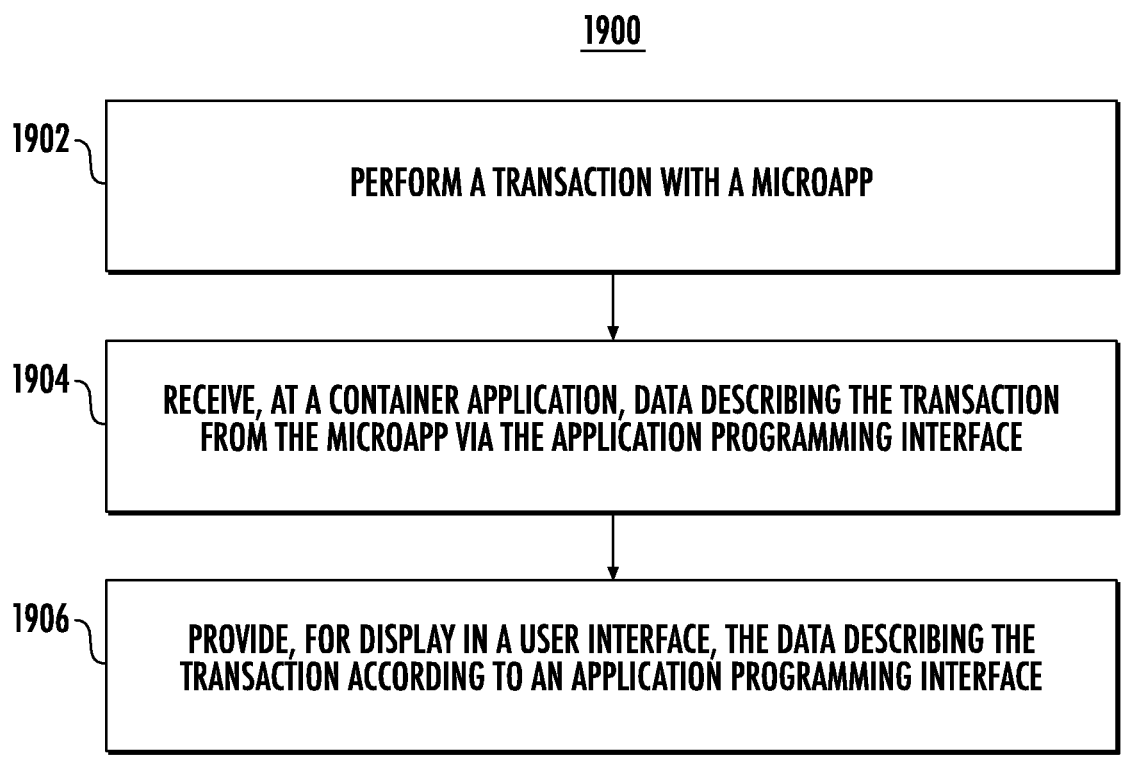
FIG. 19 depicts a flowchart of another example method for integrating a microapp into a container application according to aspects of the present disclosure.

FIG. 19 depicts a flow chart diagram of an example method for integrating microapps into a container application and/or platform according to example embodiments of the present disclosure. Although FIG. 19 depicts steps performed in a particular order for purposes of illustration and discussion, the methods of the present disclosure are not limited to the particularly illustrated order or arrangement. The various steps of the method 1900 can be omitted, rearranged, combined, and/or adapted in various ways without deviating from the scope of the present disclosure.

At 1902, the method can include performing a transaction with a microapp (e.g., in response to receiving a user input that requests performing the transaction). For example, the transaction can include ordering a good or service, such as food delivery, purchasing plane tickets, or the like, for example as described with reference to FIGS. 6 through 9. User touch inputs can be received by the user input component 122 (FIG. 1) that request completing the transaction. Data can be transmitted (e.g., wirelessly over network 180) to complete the transaction.

At 1904, the method can include receiving, at a container application, the data describing the transaction from the microapp via the application programming interface. The container application can be configured to receive data describing the transaction from the microapp via the application programming interface. An order confirmation, status, update, receipt or the like can be received via an "Order" API, for example as described above with reference FIGS. 13 through 17.

At 1906, the method can include providing, for display in a user interface, the data describing the transaction according to the application programming interface. The application programming interface can include a template describing an arrangement of the data describing the transaction within the user interface. An order confirmation, status, update, receipt or the like can be displayed according to a template included in or defined by an "Order" API, for example as described above with reference FIGS. 13 through 17. The data describing the transaction can be displayed in a touch-sensitive display screen 122 of a user computing device 102 (e.g., a smartphone, tablet, etc.)

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:
1. A computing system, comprising:
   a plurality of microapps including at least one microapp;
   a container application configured to receive an application output from the at least one microapp via an application programming interface;
   at least one processor;
   at least one tangible, non-transitory computer-readable medium that stores instructions that, when executed by the at least one processor, cause the at least one processor to perform operations, the operations comprising:
      providing, for display within a first panel in a user interface, a navigation bar based on data received from the container application;

receiving, at the container application, the application output from the at least one microapp via the application programming interface;

providing, for display within a second panel in the user interface, data describing the application output;

providing, by the container application, a setting panel for at least one global setting that applies globally to two or more of the plurality of microapps and at least one individual setting that applies to the at least one microapp;

controlling, by the container application, operation of the two or more of the plurality of microapps based on the at least one global setting; and controlling, by the container application, operation of the at least one microapp based on the at least one individual setting.

2. The computing system of claim 1, wherein the operations further comprise receiving a user input that requests that at least one of a payment or a payment request be transmitted with respect to a transaction destination described by data output by the at least one microapp.

3. The computing system of claim 2, the operations further comprise transmitting the at least one of the payment or the payment request in response to the user input.

4. The computing system of claim 1, wherein providing, for display within the second panel in the user interface, the data describing the application output, comprises providing data describing at least one of an item available for purchase or a service available for ordering.

5. The computing system of claim 1, wherein providing, for display within the first panel in the user interface, the navigation bar based on data received from the container application comprises providing, for display within the first panel in the user interface, at least one of an exit icon or a name of the at least one microapp.

6. The computing system of claim 1, wherein providing, for display within the first panel in the user interface, the navigation bar based on data received from the container application comprises providing, for display within the first panel in the user interface, a source designator that describes whether a source of the least one microapp corresponds with a source of the container application.

7. The computing system of claim 1, wherein the at least one microapp comprises a plurality of microapps, and wherein the operations further comprise displaying, within the user interface, a plurality of indicators associated with respective ones of the plurality of microapps.

8. The computing system of claim 1, wherein the at least one microapp comprises a plurality of microapps, and wherein the operations further comprise displaying a plurality of category labels describing a plurality of categories with respect to the plurality of microapps.

9. The computing system of claim 1, wherein the operations further comprise verifying an identity of a user of the computing system based on a user account of the user associated with the container application.

10. The computing system of claim 1, wherein the operations further comprise receiving a user input that requests sharing data describing the application output received from the at least one microapp via the application programming interface.

11. The computing system of claim 1, wherein the application programming interface comprises an orders API that is configured to control aspects of order processing by the at least one microapp.

12. The computing system of claim 1, wherein the application programming interface comprises a sensor API that is configured to control aspects of data processing by the at least one microapp from one or more sensors of the computing system.

13. The computing system of claim 1, wherein the application programming interface comprises a payment API that is configured to control aspects of payment processing by the at least one microapp.

14. A computer-implemented method for integrating a microapp into a container application, the computer-implement method comprising:

providing, by one or more computing devices and for display within a first panel in a user interface, a navigation bar based on data received from the container application, the container application configured to receive an application output from at least one microapp of a plurality of microapps via an application programming interface;

receiving, by the one or more computing devices and at the container application, the application output from the at least one microapp via the application programming interface;

providing, by the one or more computing devices and for display within a second panel in the user interface, data describing the application output;

providing, by the container application, a setting panel for at least one global setting that applies globally to two or more of the plurality of microapps and at least one individual setting that applies to the at least one microapp;

controlling, by the container application, operation of the two or more of the plurality of microapps based on the at least one global setting; and controlling, by the container application, operation of the at least one microapp based on the at least one individual setting.

* * * * *